US011249460B2

(12) United States Patent
Uozumi et al.

(10) Patent No.: US 11,249,460 B2
(45) Date of Patent: Feb. 15, 2022

(54) NUMERICAL CONTROL DEVICE AND METHOD FOR CONTROLLING ADDITIVE MANUFACTURING APPARATUS

(71) Applicant: Mitsubishi Electric Corporation, Tokyo (JP)

(72) Inventors: Seiji Uozumi, Tokyo (JP); Shun Kayashima, Tokyo (JP); Nobuyuki Sumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/284,472

(22) PCT Filed: Oct. 19, 2018

(86) PCT No.: PCT/JP2018/038998
§ 371 (c)(1),
(2) Date: Apr. 12, 2021

(87) PCT Pub. No.: WO2020/079829
PCT Pub. Date: Apr. 23, 2020

(65) Prior Publication Data
US 2021/0311457 A1    Oct. 7, 2021

(51) Int. Cl.
*G05B 19/4099*    (2006.01)
*G05B 19/416*    (2006.01)
(Continued)

(52) U.S. Cl.
CPC .......... *G05B 19/4099* (2013.01); *B22F 10/20* (2021.01); *B22F 12/41* (2021.01);
(Continued)

(58) Field of Classification Search
CPC .............. G05B 19/4099; G05B 19/416; G05B 2219/43147; B22F 10/20; B22F 12/41;
(Continued)

(56) References Cited

U.S. PATENT DOCUMENTS 5,994,668 A    11/1999    Sugahara et al.
2014/0297033 A1*    10/2014    Tao ........................ B23K 26/70
                                                            700/250

(Continued)

FOREIGN PATENT DOCUMENTS

EP    3332896 A1    6/2018
EP    3345742 A1    7/2018
(Continued)

OTHER PUBLICATIONS

International Search Report dated Dec. 18, 2018 in International Application No. PCT/JP2018/038998.

(Continued)

*Primary Examiner* — Yuhui R Pan
(74) *Attorney, Agent, or Firm* — Xsensus LLP

(57) ABSTRACT

A numerical control device includes: a program analyzing unit analyzing a transition of a moving velocity of a machining head and a transition of a supply amount of a material supplied to a beam-irradiation position based on a machining program; a movement distance calculating unit calculating a first distance based on a result of analysis performed by the program analyzing unit, the first distance being a length of a first movement section to a first position at which addition of the material to the workpiece is started, the first movement section being a section through which the machining head is moved while the head is accelerated; and a condition command generating unit generating a supply command to increase the supply amount of the material per hour from zero to a command value according to a machining condition while the machining head is moved through the first movement section.

8 Claims, 17 Drawing Sheets

(51) Int. Cl.
*B33Y 50/02* (2015.01)
*B23K 26/342* (2014.01)
*B22F 10/20* (2021.01)
*B22F 12/41* (2021.01)
*B23K 15/00* (2006.01)
*B33Y 10/00* (2015.01)
*B33Y 30/00* (2015.01)

(52) U.S. Cl.
CPC ........ *B23K 15/002* (2013.01); *B23K 15/0026* (2013.01); *B23K 15/0086* (2013.01); *B23K 26/342* (2015.10); *G05B 19/416* (2013.01); *B33Y 10/00* (2014.12); *B33Y 30/00* (2014.12); *B33Y 50/02* (2014.12); *G05B 2219/43147* (2013.01)

(58) Field of Classification Search
CPC ................ B23K 26/342; B23K 15/002; B23K 15/0026; B23K 15/0086; B33Y 10/00; B33Y 50/02; B33Y 30/00
See application file for complete search history.

(56) References Cited

U.S. PATENT DOCUMENTS

| | | | |
|---|---|---|---|
| 2016/0311027 A1 | 10/2016 | Shimoyama | |
| 2017/0151713 A1* | 6/2017 | Steele | B29C 64/106 |
| 2017/0248937 A1 | 8/2017 | Guimbretiere et al. | |
| 2017/0297107 A1 | 10/2017 | Oka et al. | |
| 2017/0304946 A1 | 10/2017 | Shibazaki | |
| 2018/0186093 A1 | 7/2018 | Hsieh | |
| 2018/0339457 A1* | 11/2018 | Fujimaki | B29C 64/20 |

FOREIGN PATENT DOCUMENTS

| | | | |
|---|---|---|---|
| JP | 2009-25882 A | 2/2009 | |
| JP | 2014-133231 A | 7/2014 | |
| JP | 2015-178192 A | 10/2015 | |
| JP | 2017-190505 A | 10/2017 | |
| JP | 2018-48032 A | 3/2018 | |
| JP | 2018-108721 A | 7/2018 | |
| WO | 2016/075801 A1 | 5/2016 | |

OTHER PUBLICATIONS

Supplementary European Search Report dated Aug. 28, 2020 in European Application No. 18 90 1806.
Extended European Search Report dated Sep. 7, 2020, received for EP Application 18901806.2, 10 pages.
International Search Report and Written Opinion dated Dec. 18, 2018, received for PCT Application PCT/JP2018/038998, filed on Oct. 19, 2018, 8 pages including English translation.
Decision to Grant dated Apr. 9, 2019, received for JP Application 2019-513458, 5 pages including English translation.

* cited by examiner

NUMERICAL CONTROL DEVICE AND METHOD FOR CONTROLLING ADDITIVE MANUFACTURING APPARATUS

CROSS-REFERENCE TO RELATED APPLICATION

The present application is based on PCT filing PCT/JP2018/038998, filed Oct. 19, 2018, the entire contents of which are incorporated herein by reference.

FIELD

The present invention relates to a numerical control device that controls an additive manufacturing apparatus, and to a method for controlling an additive manufacturing apparatus.

BACKGROUND

There has been known an additive manufacturing apparatus for manufacturing a modeled object having a three-dimensional shape in a direct energy deposition (DED) technology. Some additive manufacturing apparatuses manufactures a modeled object by locally melting a material using a beam emitted from a machining head and adding the molten material to a workpiece.

In a case where an additive manufacturing apparatus is controlled by a numerical control device, a machining program to be inputted to the numerical control device is typically created by a computer aided manufacturing (CAM) device. The numerical control device obtains a movement path along which a machining head is to be moved, based on analysis of a machining program, and generates a movement command that is a group of interpolated points per unit time on the movement path. The numerical control device controls an operation mechanism owned by the additive manufacturing apparatus in accordance with the movement command. The numerical control device also generates a command according to a machining condition specified by the machining program. The numerical control device controls a beam source using a command according to the condition on beam output, and controls a material supply source using a command according to the condition on the supply amount of the material.

Error may be caused between the moving velocity of the irradiation position according to the command and the moving velocity of the actual irradiation position by the influence of processes for acceleration and deceleration in driving the operation mechanism or the influence of response performance of the operation mechanism. In this case, a change in the relation between the moving velocity of the irradiation position and the supply amount of the material with respect to a case where the irradiation position is moved at the moving velocity according to the command may affect the machining accuracy of the additive manufacturing apparatus. Such a phenomenon is likely to occur when the movement of the machining head is started and the addition of the material to a workpiece is started and when the movement of the machining head is stopped and the addition to the workpiece is terminated.

Patent Literature 1 teaches a manufacturing method including spraying a modeling liquid containing a photo-curable compound and curing the modeling liquid by irradiation with a laser beam, in which runway paths are set such that the velocity of the machining head through a path along which the spraying is performed is a constant velocity. The runway path is a path along which the machining head is moved without any spraying of the modeling liquid, and set before and after the path along which the spraying is performed.

CITATION LIST

Patent Literature

Patent Literature 1: Japanese Patent Application Laid-open No. 2018-48032

SUMMARY

Technical Problem

In an additive manufacturing apparatus, error may be caused between the supply amount of a material per hour according to a command and the actual supply amount by the influence of the response performance of a supply source of the material. Such error may change the relation between the moving velocity of the irradiation position and the supply amount of the material relative to that when the supply amount of the material according to a command is applied, and thereby the change may affect the machining accuracy. Thus, there has been a problem in that an additive manufacturing apparatus may not achieve high machining accuracy even when runway paths are set in a manner similar to the conventional technique according to the above-mentioned Patent Literature 1.

The present invention has been made in view of the above circumstances, and an object thereof is to provide a numerical control device that can make an additive manufacturing apparatus perform processing with high processing accuracy, and a method for controlling the additive manufacturing apparatus.

Solution to Problem

In order to solve the aforementioned problems and achieve the object, the present invention provides a numerical control device that controls, in accordance with a machining program, an additive manufacturing apparatus that includes a machining head emitting a beam and produces a modeled object by adding a material molten by irradiation of the beam to a workpiece, the numerical control device comprising: a program analyzing unit to analyze a transition of a moving velocity of the machining head relative to the workpiece and a transition of a supply amount of the material supplied to an irradiation position of the beam on the basis of the machining program; a movement distance calculating unit to calculate a first distance on the basis of a result of analysis performed by the program analyzing unit, the first distance being a length of a first movement section to a first position with which addition of the material to the workpiece is started, the first movement section being a section through which the machining head is moved while the head is accelerated; and a condition command generating unit to generate a supply command to increase the supply amount of the material per hour from zero to a command value according to a machining condition while the machining head is moved through the first movement section.

Advantageous Effects of Invention

A numerical control device according to the present invention produces an advantageous effect of enabling an

DESCRIPTION OF EMBODIMENTS

A numerical control device and a method for controlling an additive manufacturing apparatus according to certain embodiments of the present invention will be described in detail below with reference to the drawings. Note that the present invention is not necessarily limited by these embodiments. In the following description, the numerical control device may be referred to as an NC (numerical control) device.

First Embodiment

Figure 1:
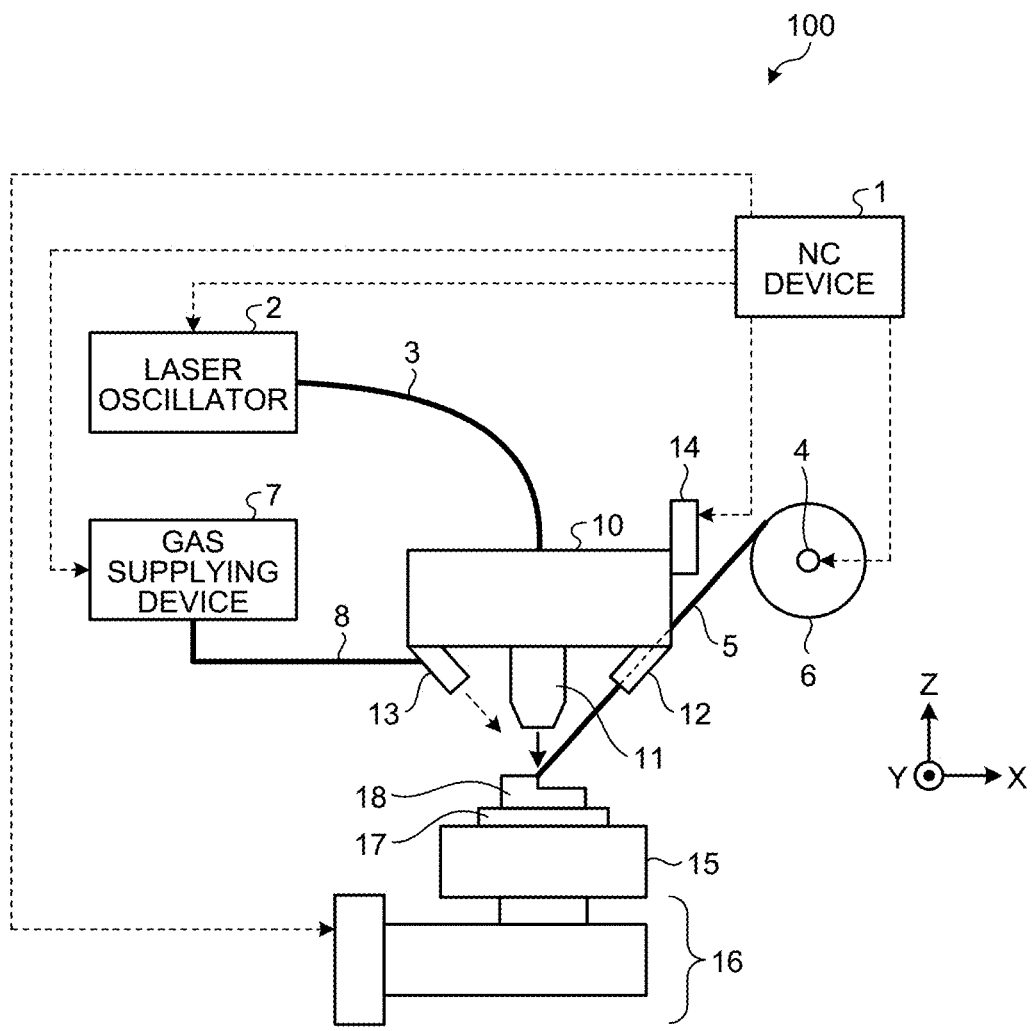
FIG. 1 is a diagram illustrating an additive manufacturing apparatus controlled by an NC device according to a first embodiment of the present invention.

FIG. 1 is a diagram illustrating an additive manufacturing apparatus 100 controlled by an NC device 1 according to a first embodiment of the present invention. The additive manufacturing apparatus 100 is a machine tool for manufacturing a modeled object by additional machining processing in which a material molten by beam irradiation is added to a workpiece. In the first embodiment, the beam is a laser beam, and the material is a wire 5 which is a metal material.

The additive manufacturing apparatus 100 forms a deposited object 18 of a metal material on a surface of a base material 17 by depositing beads on the base material 17. The bead is a linear object formed by solidification of the molten wire 5. The base material 17 is placed on a stage 15. In the following description, the workpiece refers to the base material 17 and the deposited object 18. The modeled object refers to the base material 17 and the deposited object 18 after addition of a material according to a machining program has been finished. The base material 17 illustrated in FIG. 1 is a plate material. The base material 17 may be a material other than a plate material.

The additive manufacturing apparatus 100 includes a machining head 10 having a beam nozzle 11, a wire nozzle 12, and a gas nozzle 13. The beam nozzle 11 emits a laser beam for melting a material toward the workpiece. The wire nozzle 12 advances the wire 5 toward a laser beam irradiation position on the workpiece. The gas nozzle 13 jets a gas for inhibiting the oxidation of the deposited object 18 and cooling the beads toward the workpiece.

A laser oscillator 2, which is a beam source, performs an oscillation to form a laser beam. The laser beam from the laser oscillator 2 propagates to the beam nozzle 11 passing through a fiber cable 3 that is an optical transmission path. A gas supplying device 7 supplies a gas to the gas nozzle 13 through a pipe 8.

A wire spool 6 around which the wire 5 is wound is a material supply source. The rotation of the wire spool 6 with the driving of a rotary motor 4 that is a servomotor causes the wire 5 to be fed out from the wire spool 6. The rotary motor 4 is a driving unit for supply of the material. The wire 5 out fed from the wire spool 6 passes through the wire nozzle 12 and supplied to the irradiation position of the laser beam. Note that the wire nozzle 12 may be provided with an operation mechanism for pulling out the wire 5 from the wire spool 6. The additive manufacturing apparatus 100 is provided with at least one of the rotary motor 4 coupled to the wire spool 6 and the operation mechanism for the wire nozzle 12, thereby enabling supply of the wire 5 to the irradiation position of the laser beam. Such an operation mechanism is a driving unit for supply of the material. In FIG. 1, the operation mechanism for the wire nozzle 12 is omitted.

A head drive device 14 moves the machining head 10 in each of the X-axis direction, the Y-axis direction, and the Z-axis direction. The X axis, the Y axis, and the Z axis are three axes perpendicular to each other. The X axis and the Y axis are parallel to the horizontal direction. The Z-axis direction is the vertical direction. The head drive device 14 includes a servomotor constituting an operation mechanism for moving the machining head 10 in the X-axis direction, a servomotor constituting an operation mechanism for moving the machining head 10 in the Y-axis direction, and a servomotor constituting an operation mechanism for moving the machining head 10 in the Z-axis direction. The head drive device 14 is an operation mechanism that enables translational movement in each of the directions of the three axes. In FIG. 1, the servomotors are omitted. The additive manufacturing apparatus 100 moves the irradiation position of the laser beam on the workpiece by moving the machining head 10 based on the driving of the head drive device 14.

With the machining head 10 illustrated in FIG. 1, the laser beam is made to travel in the Z-axis direction from the beam nozzle 11. The wire nozzle 12 is provided at a position away from the beam nozzle 11 in an X-Y plane, and advances the wire 5 in a direction diagonal to the Z axis. In addition, the machining head 10 may advance the wire 5 along a central axis of a laser beam emitted from the beam nozzle 11. In other words, the beam nozzle 11 and the wire nozzle 12 may be arranged coaxially. The beam nozzle 11 may emit a laser beam whose beam cross-section has been adjusted in shape to a shape of a ring formed around the wire 5, or a plurality of beams distributed around the wire 5 with the wire 5 being centered. Such a laser beam is so adjusted as to converge at the irradiation position on the workpiece.

The gas nozzle 13 of the machining head 10 illustrated in FIG. 1 is provided at a position away from the beam nozzle 11 in the X-Y plane, and produces a jet of gas in a direction diagonal to the Z axis. In addition, the machining head 10 may produce a jet of gas along the central axis of the laser beam emitted from the beam nozzle 11. In other words, the beam nozzle 11 and the gas nozzle 13 may be arranged coaxially.

A rotation mechanism 16 is an operation mechanism for rotating the stage 15. The rotation mechanism 16 rotates the workpiece together with the stage 15. The additive manufacturing apparatus 100 is capable of making the posture of the workpiece suitable for machining by rotating the stage 15 using the rotation mechanism 16.

NC device 1 controls the additive manufacturing apparatus 100 in accordance with a machining program. The NC device 1 outputs a movement command to the head drive device 14 to control the head drive device 14. The NC device 1 outputs an output command that is a command depending on a condition for beam output, to the laser oscillator 2 to control the laser oscillation of the laser oscillator 2.

The NC device 1 outputs a supply command that is a command depending on a condition for the material supply amount, to the rotary motor 4 to control the rotary motor 4. The NC device 1 controls the rotary motor 4 to adjust the velocity of the wire 5 moving from the wire spool 6 toward the irradiation position. In the following description, such velocity may also be referred to as supply rate. The supply rate represents the amount of supply of a material per hour.

The NC device 1 outputs a command depending on a condition for the gas supply amount to the gas supplying device 7 to control the amount of gas supply from the gas supplying device 7 to the gas nozzle 13. The NC device 1 outputs a rotation command to the rotation mechanism 16 to control the rotation mechanism 16. Note that the NC device 1 may be one of the components of the additive manufacturing apparatus 100 or a device external to the additive manufacturing apparatus 100.

Figure 2:
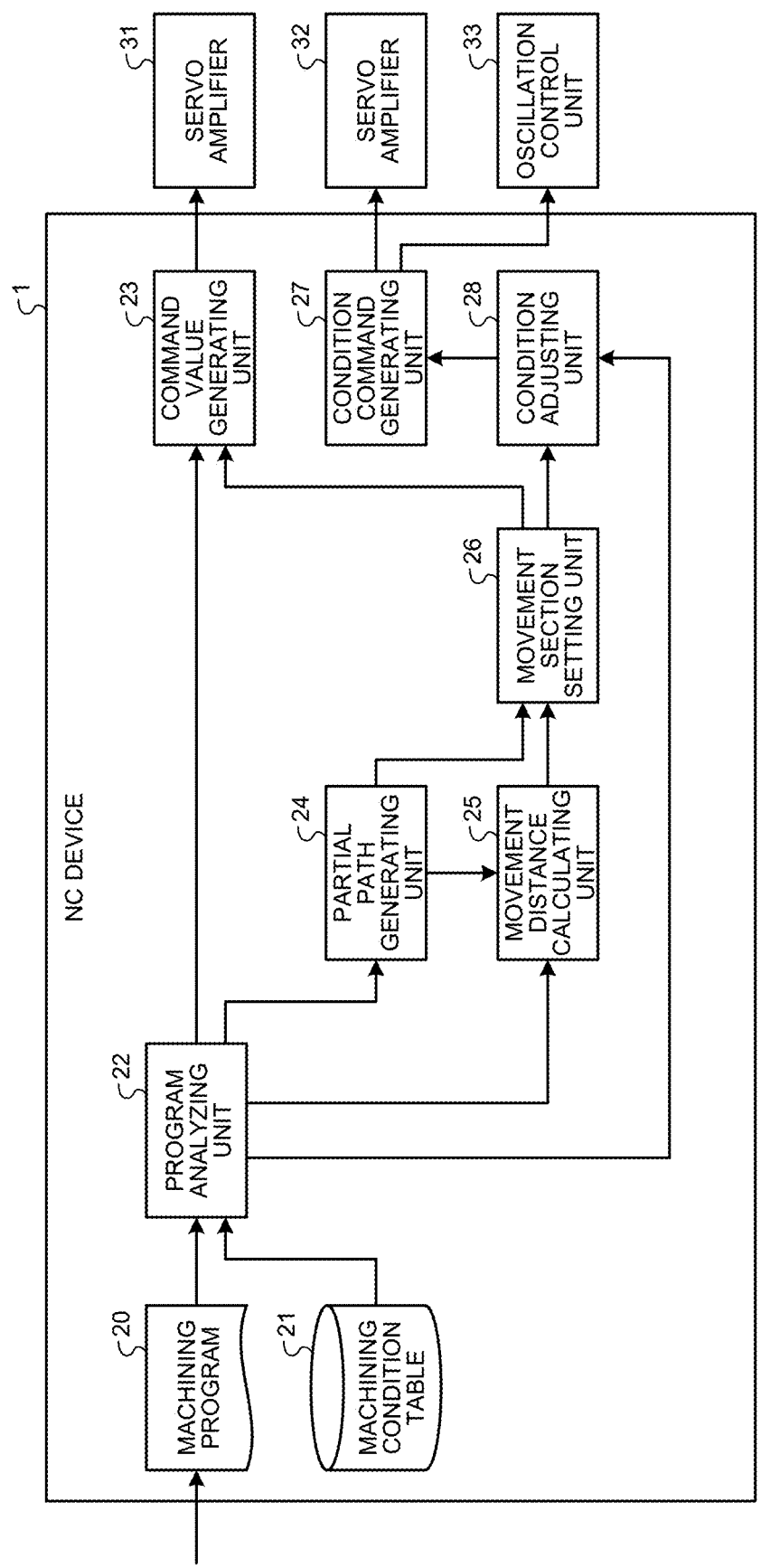
FIG. 2 is a diagram illustrating a functional configuration of the NC device that controls the additive manufacturing apparatus illustrated in FIG. 1.

FIG. 2 is a diagram illustrating a functional configuration of the NC device 1 that controls the additive manufacturing apparatus 100 illustrated in FIG. 1. A machining program 20, which is an NC program created by a CAM device, is inputted to the NC device 1. The machining program 20 specifies a machining path, which is a path along which the irradiation position of the laser beam is moved, using an instruction on a moving path along which the machining head 10 is moved relative to the workpiece placed on the stage 15.

The NC device 1 includes a machining condition table 21 in which data on various kinds of machining conditions are stored. The machining program 20 includes a command for selecting a machining condition from among the machining conditions for which data is stored in the machining condition table 21.

The NC device 1 includes a program analyzing unit 22 that analyzes the machining program 20, and a command value generating unit 23 that generates a movement command on the basis of a result of analysis of the program analyzing unit 22. The program analyzing unit 22 analyzes processes to be performed after a process being currently performed in the machining program 20. The program analyzing unit 22 analyzes a movement path along which the machining head 10 is to be moved, on the basis of the contents of processes described in the machining program 20. The program analyzing unit 22 outputs data representing the analyzed movement path to the command value generating unit 23 and a partial path generating unit 24. The command value generating unit 23 generates a movement command that is a group of interpolated points per unit time on the movement path.

The program analyzing unit 22 reads data for a machining condition specified in the machining program 20 from the machining condition table 21. The program analyzing unit 22 may also obtain data for a machining condition on the basis of the machining program 20 in which data for the machining condition is described, instead of obtaining the data for the specified machining condition from the data for various machining conditions stored in advance in the machining condition table 21. In this case as well, the program analyzing unit 22 can obtain the data for the machining condition by analyzing the machining program 20. The program analyzing unit 22 outputs the obtained data for the machining condition to a condition adjusting unit 28, which will be described later.

The program analyzing unit 22 also estimates a transition of the moving velocity of the machining head 10 relative to the workpiece and a transition of the supply rate of the wire 5 supplied to the irradiation position of the laser beam on the basis of the obtained data for the machining condition. The program analyzing unit 22 outputs data representing the result of estimation of the transition of the moving velocity of the machining head 10 and data representing the result of estimation of the transition of the supply rate of the wire 5 to a movement distance calculating unit 25, which will be described later. The program analyzing unit 22 also estimates a transition of the intensity of the laser beam on the basis of the obtained data of the machining condition. The program analyzing unit 22 outputs data representing the result of estimation of the transition of the intensity of the laser beam to the movement distance calculating unit 25.

The NC device 1 includes the partial path generating unit 24, the movement distance calculating unit 25, and a movement section setting unit 26. The partial path generating unit 24 generates a plurality of partial paths by dividing a movement path of the machining head 10. Data for the movement path is inputted to the partial path generating unit 24 from the program analyzing unit 22. The partial path generating unit 24 generates a plurality of partial paths into which a movement path is divided by extracting a partial path having a first position as a start point and a second position as an end point from the movement path. The first position is a position where the material is started to be added to the workpiece is started. The second position is a position where the addition of the material continued from the first position is stopped. Note that the number of partial paths generated from the movement path may be any number depending on the modeled object to be manufactured in accordance with the machining program 20, and can be one. The partial path generating unit 24 outputs data representing the generated partial path to the movement distance calculating unit 25 and the movement section setting unit 26.

The movement distance calculating unit 25 acquires data for the partial path from the partial path generating unit 24, and calculates a first distance, which is the length of a first movement section set for each partial path, and a second distance, which is the length of a second movement section set for each partial path. The first movement section is a section in which the machining head 10 is moved while being accelerated from the position where the movement of the machining head 10 is started to the first position, which is an acceleration section before the addition of the material is started. The second movement section is a section in which the machining head 10 is moved while being decelerated from the second position to the position where the movement of the machining head 10 is stopped, which is a deceleration section after the addition of the material is stopped.

The movement distance calculating unit 25 also acquires the data representing the result of estimation of the transition of the moving velocity of the machining head 10 and the data representing the result of estimation of the transition of the supply rate of the material from the program analyzing unit 22. The movement distance calculating unit 25 calculates the first distance and the second distance on the basis of the result of analysis of the transition of the moving velocity of the machining head 10 and the result of analysis of the transition of the supply rate of the material. In this manner, the movement distance calculating unit 25 calculates the first distance and the second distance on the basis of the result of analysis performed by the program analyzing unit 22. The movement distance calculating unit 25 outputs data representing the first distance regarding the first movement section of each partial path and data representing the second distance regarding the second movement section of each partial path to the movement section setting unit 26.

The movement section setting unit 26 acquires the data for the partial paths from the partial path generating unit 24 and acquires the data representing the first distance of each partial path and the data representing the second distance of each partial path from the movement distance calculating unit 25. The movement section setting unit 26 sets the first movement section having the first distance and the second movement section having the second distance for each partial path. The movement section setting unit 26 sets the first movement section in the tangential direction of the partial path at the first position for each partial path. The movement section setting unit 26 sets the second movement section in the tangential direction of the partial path at the second position for each partial path. Thus, the movement section setting unit 26 sets the first movement section having the first distance in the tangent point direction of a partial path at the first position. The movement section setting unit 26 sets the second movement section having the second distance in the tangent point direction of a partial path at the second position. The movement section setting unit 26 outputs data on the setting of the first movement section and data on the setting of the second movement section to the command value generating unit 23 and the condition adjusting unit 28.

The NC device 1 includes a condition command generating unit 27 and the condition adjusting unit 28. The condition adjusting unit 28 acquires the data for the machining condition from the program analyzing unit 22. The condition adjusting unit 28 adjusts the machining condition in accordance with the setting of the first movement section and the second movement section performed by the movement section setting unit 26. The condition adjusting unit 28 adjusts the condition on the supply of the wire 5 and the condition on the output of the laser beam for the partial path, the first movement section, and the second movement section. The condition command generating unit 27 outputs data for the adjusted machining condition to the condition command generating unit 27.

The condition command generating unit 27 generates a command according to the machining condition. The condition command generating unit 27 acquires the data of the adjusted machining condition from the condition adjusting unit 28. The condition command generating unit 27 generates various commands on the basis of the acquired data for the machining condition. The condition command generating unit 27 generates a supply command, which is a command on the supply of the material, and an output command for the output of the laser beam. The condition command generating unit 27 generates a supply command to increase the material supply amount per hour from zero to a command value according to the machining condition while the machining head 10 moves through the first movement section. The condition command generating unit 27 generates a supply command to decrease the material supply amount per hour from the command value according to the machining condition to zero while the machining head 10 moves through the second movement section. The condition command generating unit 27 generates an output signal for starting output of the laser beam by laser oscillation when the machining head 10 reaches the first position. The condition command generating unit 27 generates an output command to stop the laser beam by stopping the laser oscillation when the machining head 10 reaches the second position.

The command value generating unit 23 acquires the data on the setting of the first movement section and the data on the setting of the second movement section from the movement section setting unit 26. The command value generating unit 23 generates a movement command that is a group of interpolated points per unit time in the first movement section, on the basis of the data on the setting of the first movement section. The command value generating unit 23 generates a movement command that is a group of interpolated points per unit time in the second movement section, on the basis of the data on the setting of the second movement section. The command value generating unit 23 generates a movement command that is a group of interpolated points per unit time on the partial path for each partial path. The NC device 1 outputs the commands generated by the command value generating unit 23.

The head drive device 14 illustrated in FIG. 1 includes a servo amplifier 31 that controls the driving of each of the servomotors included in the head drive device 14. The servo amplifier 31 controls the driving of each of the servomotors in accordance with the movement commands outputted from the NC device 1.

The rotary motor 4 illustrated in FIG. 1 is provided with a servo amplifier 32 that controls the rotating operation. The servo amplifier 32 controls the driving of the rotary motor 4 in accordance with a command on the material supply rate among the commands outputted from the NC device 1. The laser oscillator 2 illustrated in FIG. 1 includes an oscillation control unit 33 that controls the laser oscillation. The oscillation control unit 33 controls the laser oscillation in accordance with a command on the laser output among the commands outputted from the NC device 1.

In addition, the NC device 1 outputs a command depending on the condition for the gas supply amount to the gas supplying device 7. The NC device 1 outputs a rotation command to the rotation mechanism 16. As just described, the NC device 1 controls the entire additive manufacturing apparatus 100 by outputting various kinds of commands.

Next, a hardware configuration of the NC device 1 will be described. The functional units of the NC device 1 illustrated in FIG. 2 are implemented by a control program, which is a program for performing a method for controlling the additive manufacturing apparatus 100 of the first embodiment, being executed with use of hardware.

Figure 3:
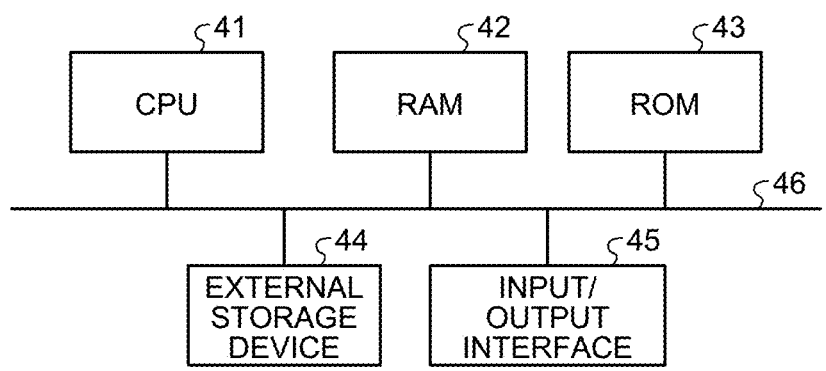
FIG. 3 is a block diagram illustrating a hardware configuration of the NC device according to the first embodiment.

FIG. 3 is a block diagram illustrating a hardware configuration of the NC device 1 according to the first embodiment. The NC device 1 includes a central processing unit (CPU) 41 that performs various processes, a random access memory (RAM) 42 including a data storage area, a read only memory (ROM) 43, which is a nonvolatile memory, an external storage device 44, and an input/output interface 45 for inputting information to the NC device 1 and outputting information from the NC device 1. The components illustrated in FIG. 3 are connected with each other via a bus 46.

The CPU 41 executes programs stored in the ROM 43 and the external storage device 44. The program analyzing unit 22, the command value generating unit 23, the partial path generating unit 24, the movement distance calculating unit 25, the movement section setting unit 26, the condition command generating unit 27, and the condition adjusting unit 28 illustrated in FIG. 2 are implemented with use of the CPU 41.

The external storage device 44 is a hard disk drive (HDD) or a solid state drive (SSD). The external storage device 44 stores a control program and various kinds of data. The external storage device 44 stores the machining program 20 and the machining condition table 21 illustrated in FIG. 2. The ROM 43 stores software or a program for controlling hardware, which is a boot loader such as a basic input/output system (BIOS) that is a program for control and forms a base for a computer or a controller that is the NC device 1 or a unified extensible firmware interface (UEFI). Note that the control program may be stored in the ROM 43.

The programs stored in the ROM 43 and the external storage device 44 are loaded into the RAM 42. The CPU 41 develops the control program in the RAM 42 to perform various processes. The input/output interface 45 is an interface for connection with devices external to the NC device 1. The machining program 20 and the data stored in the machining condition table 21 are inputted to the input/output interface 45. In addition, the input/output interface 45 outputs various commands. The NC device 1 may include an input device such as a keyboard and a pointing device, and an output device such as a display.

The control program may be stored in a storage medium configured to be readable by a computer. The NC device 1 may store the control program stored in a storage medium into the external storage device 44. The storage medium may be a portable storage medium, which is a flexible disk, or a flash memory, which is a semiconductor memory. The control program may be installed into a computer or controller that serves as the NC device 1 from another computer or server device via a communication network.

The functions of the NC device 1 may be implemented by a processing circuit that is a dedicated hardware set for controlling the additive manufacturing apparatus 100. The processing circuit is a single circuit, a composite circuit, a programmed processor, a parallel-programmed processor, an application specific integrated circuit (ASIC), a field-programmable gate array (FPGA), or any combination of them. Some of the functions of the NC device 1 may be implemented by dedicated hardware, and others may be implemented by software or firmware.

Figure 4:
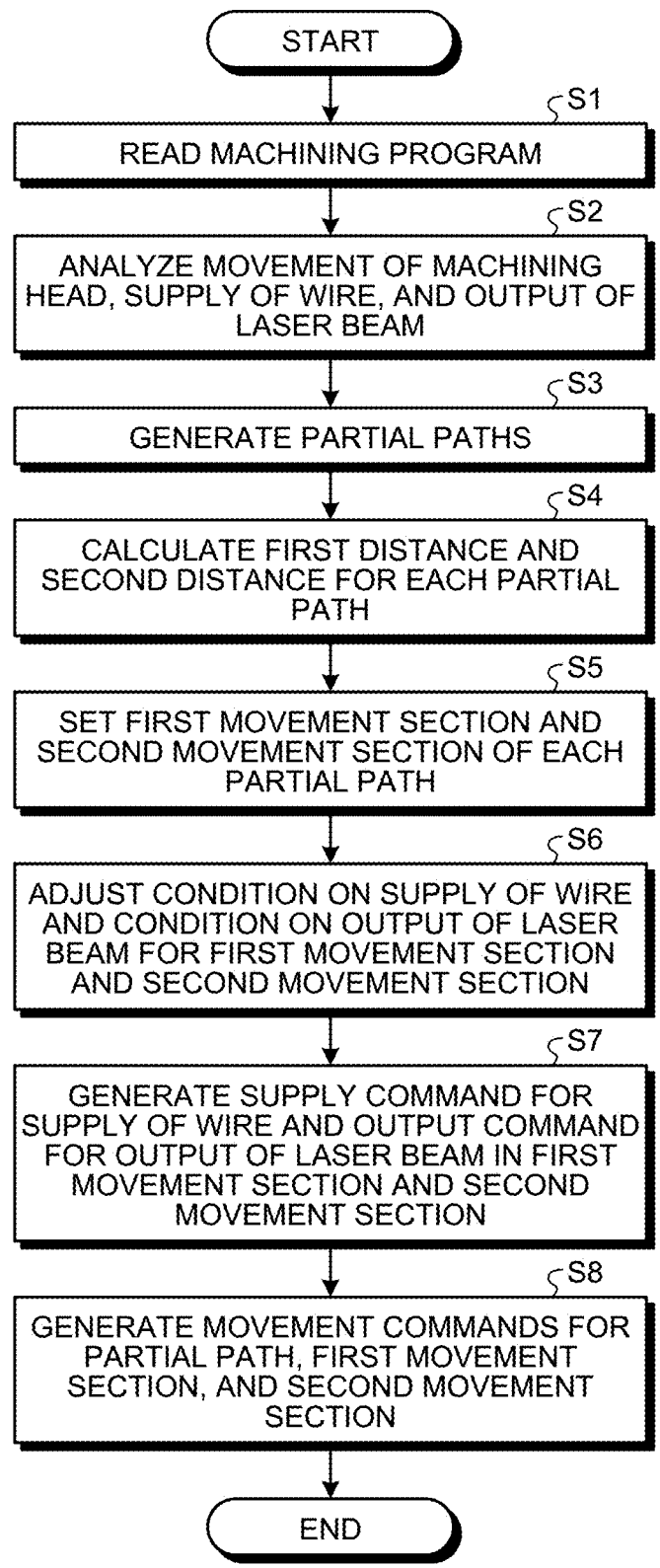
FIG. 4 is a flowchart illustrating a procedure of the operation performed by the NC device illustrated in FIG. 2.

Next, an operation performed by the NC device 1 will be explained. FIG. 4 is a flowchart illustrating a procedure of the operation performed by the NC device 1 illustrated in FIG. 2. In step S1, the program analyzing unit 22 reads out the machining program 20 stored in the external storage device 44 illustrated in FIG. 3.

The content of a movement command is specified by a G code. A G code is expressed by a combination of a character "G" and a numeric character. An F code is used for a velocity command that is a command for the velocity at which the machining head 10 is to be moved. An F code is expressed by a combination of a character "F" and a numeric character representing the velocity. The numeric character representing the velocity may be a velocity value, or an identifier for selecting a velocity value from among velocity values stored in advance in the external storage device 44.

In addition, information for specifying a machining condition from among various machining conditions of which data sets are stored in the machining condition table 21 is described in the machining program 20. An M code including a character "M" is used for the information for specifying a machining condition. An M code include an identifier for selecting a machining condition from among the machining conditions of which data sets are stored in the machining condition table 21. The program analyzing unit 22 selects a machining condition on the basis of such an identifier, and reads out data for the selected machining condition from the machining condition table 21. A G code may be used for the information for specifying a machining condition. The program analyzing unit 22 selects, using a G code or an M code, a machining condition for forming beads having a target height and a target width by additive processing. Note that data for the machining condition may be described in the machining program 20. In this case, the program analyzing unit 22 reads out the data for the machining condition from the machining program 20.

In step S2 that is an analyzing process, the program analyzing unit 22 analyzes the movement of the machining head 10, the supply of the wire 5, and the output of the laser beam on the basis of the machining program 20 read out in step S1. In step S2, the program analyzing unit 22 analyzes the processes to be performed after the process being currently performed, by pre-reading the machining program 20. The program analyzing unit 22 analyzes information of each of the movement path of the machining head 10, the moving velocity of the machining head 10 relative to the workpiece, the output of the laser beam in additive machining, and the supply rate of the wire 5 in additive machining on the basis of the machining program 20. The program analyzing unit 22 also analyzes the transition of the moving velocity of the machining head 10, the transition of the supply rate of the wire 5, and the transition of the output of the laser beam.

In step S3 that is a partial path generating step, the partial path generating unit 24 generates a partial path by dividing the movement path analyzed in step S2. The partial path generating unit 24 determines, as the first position, the position on the movement path at which the movement of the machining head 10 for machining is started. The partial path generating unit 24 determines, as the second position, the position at which the movement of the machining head 10 for machining is stopped. The partial path generating unit 24 extracts a partial path having the first position as a start point and the second position as an end point, from the movement path. The partial path generating unit 24 is capable of checking the start of the movement and the stop of the movement on the basis of a change in an operation mode specified by a G code. Note that the partial path generating unit 24 may determine the position at which the supply of the wire 5 for machining is started as the first position, and the position at which the supply of the wire 5 for machining is stopped as the second position. The partial path generating unit 24 may determine the position at which the output of the laser beam for machining is turned on as the first position, and the position at which the output of the laser beam for machining is turned off from on as the second position. Alternatively, the partial path generating unit 24 may determine the first position and the second position on the basis of specifying of a change in the machining condition performed by an M code.

In step S4 that is a calculating process, the movement distance calculating unit 25 calculates the first distance and the second distance for each of the partial paths generated in step S3. The movement distance calculating unit 25 calculates the first distance and the second distance on the basis of the result of analysis of the transition of the moving velocity of the machining head 10 and the result of analysis of the transition of the supply rate of the wire 5.

Figure 5:
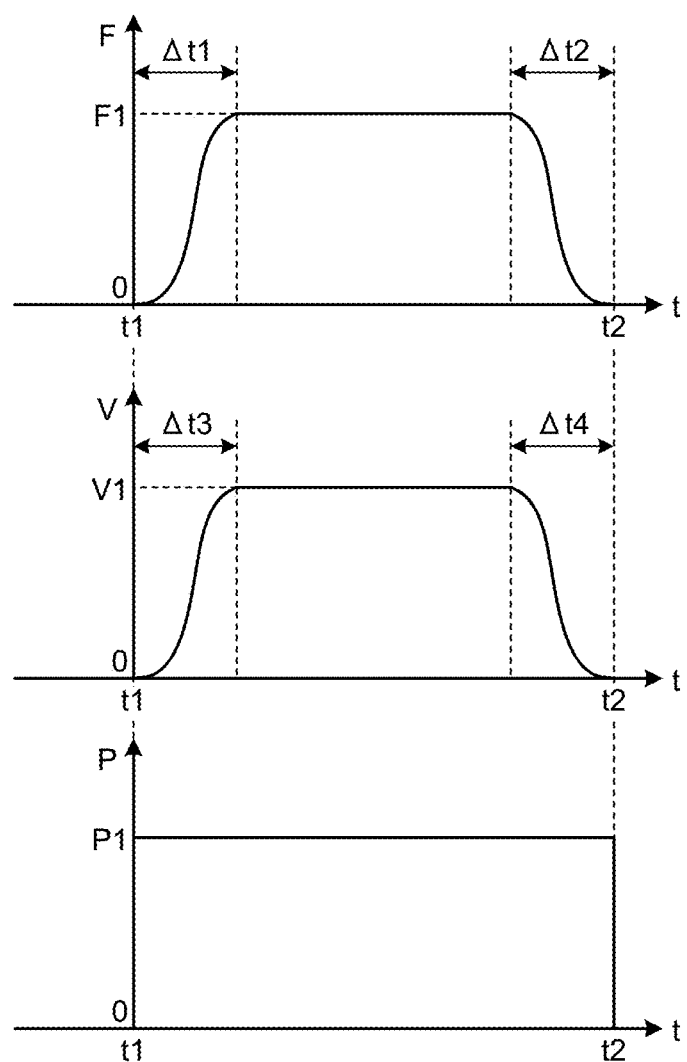
FIG. 5 is a graph illustrating a relation among the moving velocity of a machining head, the supply rate of a wire, and the intensity of a laser beam, which is a relation for a comparative example of the first embodiment.

FIG. 5 is a graph illustrating the relation among the moving velocity of the machining head 10, the supply rate of the wire 5, and the intensity of the laser beam, which is a relation according to a comparative example with respect to the first embodiment. The upper part of FIG. 5 illustrates the relation between the moving velocity F of the machining head 10 and time t. The middle part of FIG. 5 illustrates the relation between the supply rate V of the wire 5 and time t. The lower part of FIG. 5 illustrates the relation between the intensity P of the laser beam and time t. Note that the relations in the comparative example illustrated in FIG. 5 are relations in a case where the NC device 1 controls the machining head 10, the rotary motor 4, and the laser oscillator 2 in accordance with the commands described in the machining program 20, the relation representing relationship in a case where the first movement section and the second movement section described above have not been set. t=t1 is regarded as the start point of a partial path. t=t2 is regarded as the end point of the partial path.

The movement of the machining head 10 is started at the start point of the partial path and stopped at the end point of the partial path. The moving velocity F is accelerated during a period $\Delta t1$ from the start point until the moving velocity reaches a velocity value F1 specified by the velocity command in the machining program 20. Thereafter, the moving velocity F is maintained at the specified velocity value F1, and then decelerated during a period $\Delta t2$ until the machining head 10 reaches the end point. The transitions of the moving velocity F during the period $\Delta t1$ and during the period $\Delta t2$ are affected by an acceleration/deceleration process on the driving of the head drive device 14 and a smoothing process for mitigating a change in the velocity. The acceleration/deceleration process and the smoothing process are performed by the command value generating unit 23.

The supply of the wire 5 is started at the start point of the partial path and stopped at the end point of the partial path. The supply rate V is accelerated during a period $\Delta t3$ from the start point until the supply rate reaches a rate value V1 specified by the machining program 20. Thereafter, the supply rate V is maintained at the specified rate value V1, and then decelerated until the end point is reached. The transitions of the supply rate V during the period $\Delta t3$ and during a period $\Delta t4$ are affected by the acceleration/deceleration process on the driving of the rotary motor 4 and a smoothing process for mitigating a change in the velocity during acceleration/deceleration.

The output of the laser beam by the laser oscillator 2 is started at the start point of the partial path and stopped at the end point of the partial path. Normally, the response speed of the laser oscillator 2 is higher than that of the head drive device 14 and higher than that of the rotary motor 4. Thus, the intensity P of the laser beam reaches an intensity value P1 specified by the machining program 20 at the start point of the partial path before the moving velocity F and the supply rate V reach the velocity value F1 and the rate value V1, respectively. In addition, the intensity P of the laser beam starts decreasing from the intensity value P1 at the end point of the partial path after the moving velocity F and the supply rate V start deceleration from the velocity value F1 and the rate value V1, respectively. In the relations illustrated in FIG. 5, the intensity P is regarded as being changed from zero to the intensity value P1 at the same time as the start point, and changed from the intensity value P1 to zero at the same time as the end point.

As described above, in the case of the relations illustrated in FIG. 5, error is caused between the velocity value F1 specified by the machining program 20 and the actual moving velocity F during the period $\Delta t1$ from the start point of the partial path and during the period $\Delta t2$ until the end point of the partial path. In addition, error is caused between the rate value V1 specified by the machining program 20 and the actual supply rate V during the period $\Delta t3$ from the start point of the partial path and during the period $\Delta t4$ until the end point of the partial path. Because the relation between the supply amount of the wire 5 and the intensity of the laser beam at each interpolated point varies in some parts of the partial path where such an error is caused, the machining accuracy can be degraded.

In step S4, the movement distance calculating unit 25 calculates the first distance that enables the supply rate V to be increased from zero to the rate value V1 for machining during the movement through the first movement section. The movement distance calculating unit 25 also calculates the second distance that enables the supply rate V to be decreased from the rate value V1 to zero during the movement through the second movement section.

The movement distance calculating unit 25 calculates the first distance and the second distance for making the relation between the supply amount of the wire 5 and the intensity of the laser beam at each interpolated point of the partial path be a constant relation. The movement distance calculating unit 25 calculates the first distance and the second distance on the basis of the result of analysis of the transition of the moving velocity F, the result of analysis of the transition of the supply rate V, and the result of analysis of the transition of the intensity P.

In step S5 that is a movement section setting process, the movement section setting unit 26 sets the first movement section and the second movement section in each partial path. The movement section setting unit 26 sets the first movement section of each partial path on the basis of the first distance calculated in step S4. The movement section setting unit 26 sets the second movement section of each partial path on the basis of the second distance calculated in step S4. In addition, the movement section setting unit 26 obtains, for each partial path, a tangential direction of the partial path at the first position and a tangential direction of the movement path at the second position. The movement section setting unit 26 sets, for each partial path, the first movement section in the same direction as the tangential direction at the first position. The movement section setting unit 26 sets, for each partial path, the second movement section in the same direction as the tangential direction at the second position.

In step S6 that is a condition adjusting process, the condition adjusting unit 28 adjusts the condition on the supply of the wire 5 and the condition on the output of the laser beam for the first movement section and the second movement section of each partial path. In step S7 that is a command generating process, the condition command generating unit 27 generates a supply command for the wire 5 and an output command for the laser beam in the first movement section and the second movement section on the basis of the condition adjusted in step S6. The condition command generating unit 27 also generates various commands for a partial path on the basis of the condition adjusted by the condition adjusting unit 28.

Figure 6:
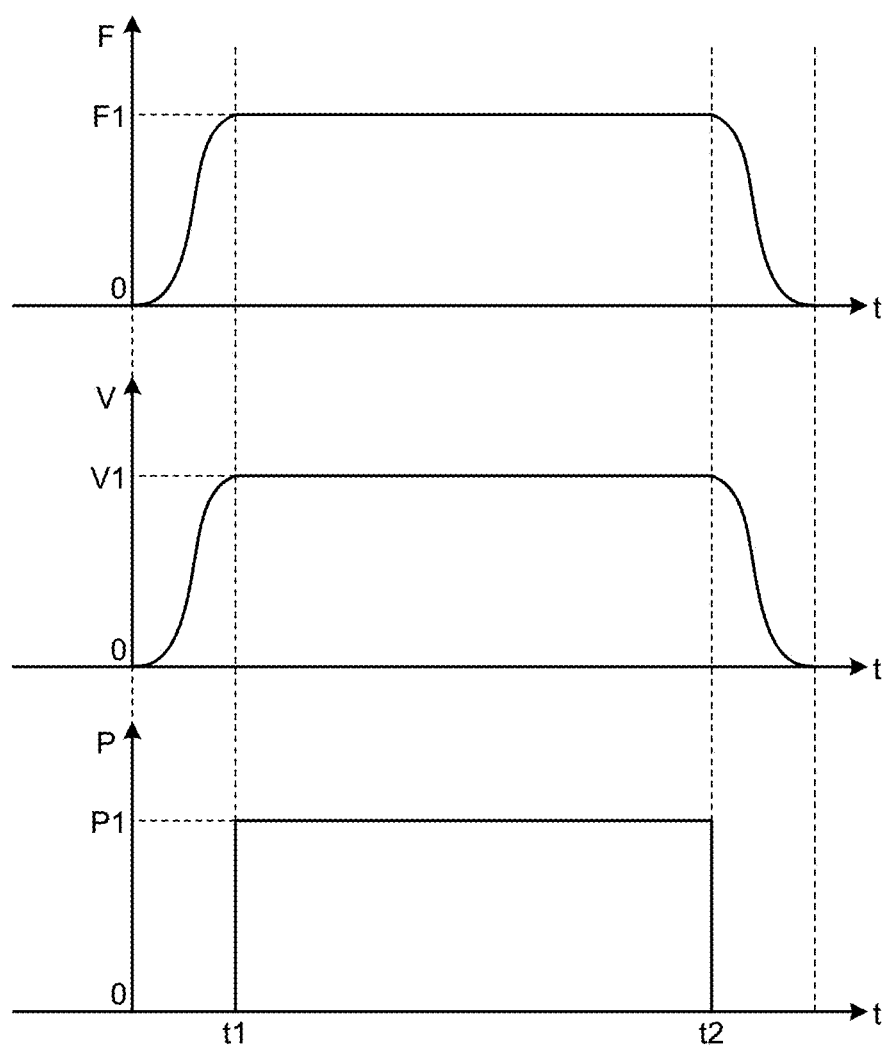
FIG. 6 is a graph for explaining the supply rate of the wire and the intensity of the laser beam adjusted by a condition adjusting unit owned by the NC device illustrated in FIG. 2.

FIG. 6 is a graph for explaining the supply rate of the wire 5 and the intensity of the laser beam adjusted by the condition adjusting unit 28 owned by the NC device 1 illustrated in FIG. 2. The upper part of FIG. 6 illustrates the relation between the moving velocity F of the machining head 10 and time t. The middle part of FIG. 6 illustrates the relation between the supply rate V of the wire 5 and time t. The lower part of FIG. 6 illustrates the relation between the intensity P of the laser beam and time t.

The condition adjusting unit 28 sets the start of acceleration of the supply rate V from zero in the first movement section. The timing at which the acceleration of the wire 5 is started is set to a timing at which the supply rate V can be increased to the rate value V1 at the start point of the partial path. The condition adjusting unit 28 sets the start of deceleration of the supply rate V at the start point of the second movement section, that is, the end point of the partial path. The supply rate V decreases from the rate value V1 to zero in the second movement section. The condition adjusting unit 28 performs setting to start the output of the laser beam having the intensity value P1 at the same time as the start point of the partial path and setting to stop the output of the laser beam of the intensity value P1 at the same time as the end point of the partial path.

In step S8 that is a movement command generating process, the command value generating unit 23 generates the movement commands for the partial path, the first movement section, and the second movement section. The NC device 1 thus terminates the operation according to the procedures illustrated in FIG. 4. The additive manufacturing apparatus 100 stops the additive machining in the first movement section and the second movement section by stopping the output of the laser beam in the first movement section and the second movement section. In addition, the relation between the supply amount of the wire 5 and the intensity of the laser beam at each interpolated point is made to be constant, thereby making it possible to achieve high machining accuracy.

Figure 7:
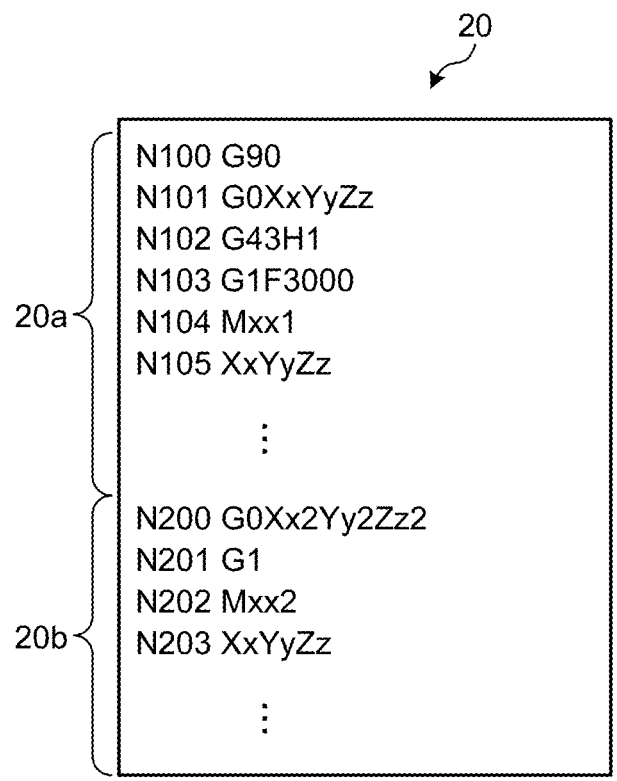
FIG. 7 is a diagram illustrating an example of a machining program inputted to a program analyzing unit owned by the NC device illustrated in FIG. 2.
Figure 8:
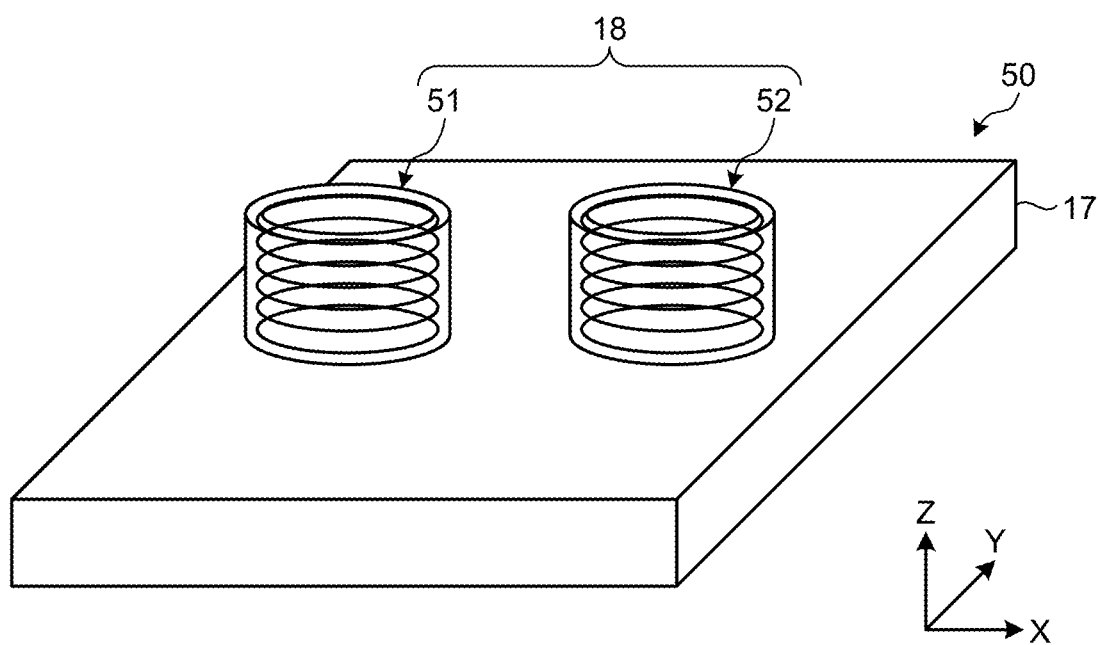
FIG. 8 is a diagram illustrating an example of a modeled object manufactured by additive machining according to the machining program illustrated in FIG. 7.

Next, details of the processes performed by the components of the NC device 1 illustrated in FIG. 2 will be explained. FIG. 7 is a diagram illustrating an example of the machining program 20 inputted to the program analyzing unit 22 owned by the NC device 1 illustrated in FIG. 2. FIG. 8 is a diagram illustrating an example of a modeled object 50 manufactured by the additive machining according to the machining program 20 illustrated in FIG. 7.

The modeled object 50 illustrated in FIG. 8 includes the base material 17, and two columnar objects 51 and 52, which correspond to the deposited object 18. The columnar objects 51 and 52 are formed on the surface of the base material 17. The columnar object 51 and the columnar object 52 are provided at a distance in the X-axis direction. Each of the columnar object 51 and the columnar object 52 is formed by deposition of a plurality of annular beads in the Z-axis direction.

A process for machining the columnar object 51 and a process for machining the columnar object 52 are described in the machining program 20 illustrated in FIG. 7. A block group 20a starting with a block "N100" represents the process for machining the columnar object 51. A block group 20b starting with a block "N200" represents the process for machining the columnar object 52.

A block "N101" in the block group 20a represents positioning by fast-forwarding movement to the position of coordinates (x, y, z). A block "N104" represents specifying a machining condition "D1". A block "N105" and subsequent blocks in the block group 20a constitute a group of coordinate values expressing the shape of the columnar object 51. The block "N200" in the block group 20b represents positioning by fast-forwarding movement to the position of coordinates (x2, y2, z2). A block "N202" represents specifying a machining condition "D2". A block "N203" and subsequent blocks in the block group 20b constitute a group of coordinate values expressing the shape of the columnar object 52.

The machining condition "D1", which is a machining condition for the columnar object 51, is regarded as including conditions of the moving velocity F of the machining head 10 being the velocity value F1, the supply rate V of the wire 5 being the rate value V1, and the intensity P of the laser beam being the intensity value P1. In addition, $V1=(\frac{1}{2}) \times F1$ is assumed to be satisfied. The machining condition "D2", which is the machining condition for the columnar object 52, is regarded as including conditions of the moving velocity F being a velocity value F2, the supply rate V being a rate value V2, and the intensity P being an intensity value P2. In addition, $F2=F1$, $V2=2 \times F1$, and $P2=P1$ are assumed to be satisfied.

In the following description, an analyzed value of the moving velocity F, which is a result of analysis based on the machining program 20 is referred to as an estimated velocity Fc. The estimated velocity Fc may be expressed as $Fc(t, k)$. t is set as a variable representing time. k is set as a variable representing the columnar object 51 or 52. $k=1$ represents the first columnar object 51 to be firstly machined among the columnar objects 51 and 52. $k=2$ represents the second columnar object 52 to be secondly machined among the columnar objects 51 and 52. The program analyzing unit 22 analyzes the transition of the moving velocity F during machining of the columnar object 51 on the basis of the analysis result of the shape of the columnar object 51.

Figure 9:
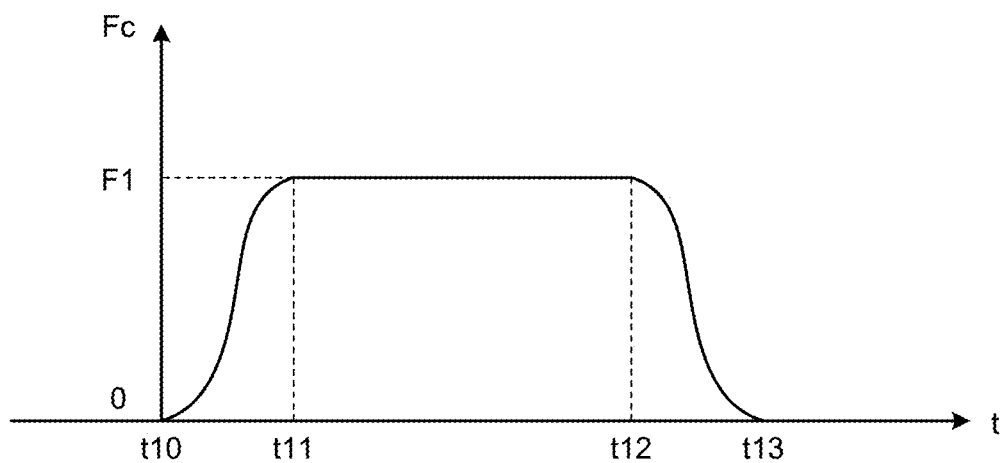
FIG. 9 is a graph illustrating an example of a result of analysis of a moving velocity, obtained by the program analyzing unit illustrated in FIG. 2.

FIG. 9 is a graph illustrating an example of the result of analysis of the moving velocity obtained by the program analyzing unit 22 illustrated in FIG. 2. Time t10 is the time when the movement of the machining head 10 is started. Time t13 is the time when the movement of the machining head 10 is stopped. The movement of the machining head 10 is accelerated from Fc(t10, 1) at time t10 to Fc(t11, 1) at time t11, and Fc(t11, 1) thus reaches the velocity value F1. The estimated velocity Fc is constant at the velocity value F1 from Fc(t11, 1) at time t11 to Fc(t12, 1) at time t12. The movement of the machining head 10 is decelerated from Fc(t12, 1) at time t12 to Fc(t13, 1) at time t13, and Fc(t13, 1) thus becomes zero.

In the following description, an analyzed value of the supply rate V, which is a result of analysis based on the machining program 20 is represented as an estimated rate Vc. The estimated rate Vc may also be expressed as Vc(t, k). The program analyzing unit 22 analyzes the transition of the supply rate V in machining of the columnar object 51 on the basis of the condition on the supply rate V included in the machining condition "D1".

Figure 10:
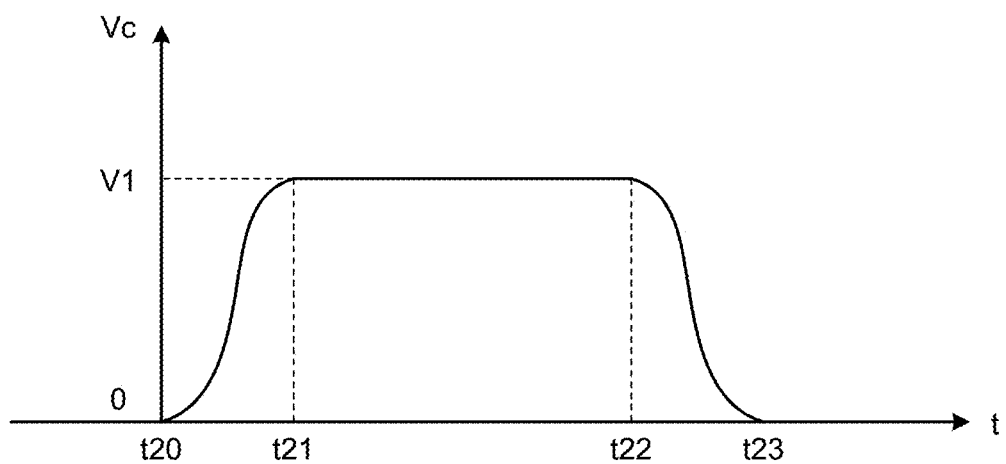
FIG. 10 is a graph illustrating an example of a result of analysis of a supply rate performed by the program analyzing unit illustrated in FIG. 2.

FIG. 10 is a graph illustrating an example of the result of analysis of the supply rate obtained by the program analyzing unit 22 illustrated in FIG. 2. Time t20 is the time when the supply of the wire 5 is started. Time t23 is the time when the supply of the wire 5 is stopped. The supply of the wire 5 is accelerated from Vc(t20, 1) at time t20 to Vc(t21, 1) at time t21, and Vc(t21, 1) thus reaches the rate value V1. The estimated rate Vc is constant at the rate value V1 from Vc(t21, 1) at time t21 to Vc(t22, 1) at time t22. The supply of the wire 5 is decelerated from Vc(t22, 1) at time t22 to Vc(t23, 1) at time t23, and Vc(t23, 1) thus becomes zero.

In the following description, an analyzed value of the intensity P, which is a result of analysis based on the machining program 20 is represented as an estimated intensity Pc. The estimated intensity Pc may also be expressed as Pc(t, k). The program analyzing unit 22 analyzes the transition of the intensity P in machining of the columnar object 51 on the basis of the condition of the intensity P included in the machining condition "D1".

Figure 11:
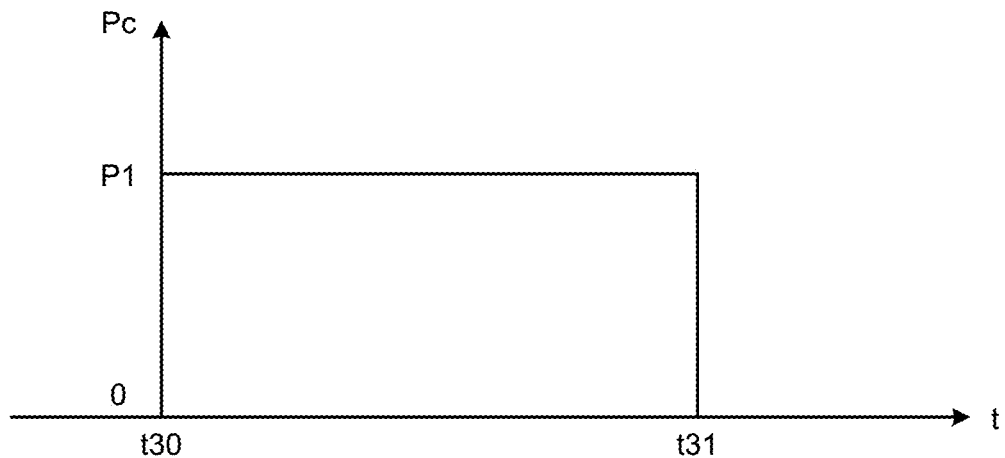
FIG. 11 is a graph illustrating an example of a result of analysis of the intensity of a laser beam, obtained by the program analyzing unit illustrated in FIG. 2.

FIG. 11 is a graph illustrating an example of the result of analysis of the intensity of the laser beam obtained by the program analyzing unit 22 illustrated in FIG. 2. Time t30 is the time when the output of the laser beam is started. Time t31 is the time when the output of the laser beam is stopped. The estimated intensity Pc changes from zero to the intensity value P1 at time t30. The estimated intensity Pc is constant at the intensity value P1 from Pc(t30, 1) at time t30 to Pc(t31, 1) at time t31. The estimated intensity Pc changes from the intensity value P1 to zero at time t31. Thus, the relation of Pc(t, k)=P1 is satisfied.

The program analyzing unit 22 analyzes the transition of the moving velocity F during machining of the columnar object 52 on the basis of the analysis result of the shape of the columnar object 52. The program analyzing unit 22 analyzes the transition of the moving velocity F in machining of the columnar object 52 in a manner similar to the case of the columnar object 51. Fc(t, 2), which is the estimated velocity Fc for the columnar object 52 is made constant at the velocity value F2 from the end of acceleration to the start of deceleration. The program analyzing unit 22 analyzes the transition of the supply rate V in machining of the columnar object 52 in a manner similar to the case of the columnar object 51. Vc(t, 2), which is the estimated rate Vc for the columnar object 52, is made constant at the rate value V2 from the end of acceleration to the start of deceleration. The program analyzing unit 22 analyzes the transition of the intensity P in machining of the columnar object 52 in a manner similar to the case of the columnar object 51. Pc(t, 2), which is the estimated intensity Pc for the columnar object 52 is made constant at the intensity value P2 from the end of acceleration to the start of deceleration.

The analysis processes of the machining program 20 performed by the program analyzing unit 22 may be performed in parallel with processes performed by the command value generating unit 23, the partial path generating unit 24, the movement distance calculating unit 25, the movement section setting unit 26, the condition command generating unit 27, and the condition adjusting unit 28 illustrated in FIG. 2.

The program analyzing unit 22 analyzes the movement path of the machining head 10 in machining of the whole deposited object 18 on the basis of the result of analysis of the shape of the whole deposited object 18 formed by execution of the machining program 20. The partial path generating unit 24 determines the position on such a movement path at which Vc(t, k) is zero as a boundary between partial paths. The partial path generating unit 24 generates a partial path by dividing the movement path for each of such boundaries.

In the machining program 20 illustrated in FIG. 7, a block "N103" represents the movement of the machining head 10 in a mode specified by "G1", which is a G code. The additive manufacturing apparatus 100 moves the machining head 10 in the mode specified by the block "N103" and machines the columnar object 51. After finishing the machining of the columnar object 51, the machining head 10 performs positioning indicated by the block "N200". Thereafter, the additive manufacturing apparatus 100 moves the machining head 10 in a mode specified by a block "N201", and machines the columnar object 52. A block including "G0" represents that the movement in the mode specified before this block is to be stopped and positioning is to be performed, that is, Vc(t, k) is to be temporarily zero.

Next, processes performed by the partial path generating unit 24 will be explained. The partial path generating unit 24 acquires the data on the movement path from the program analyzing unit 22. The partial path generating unit 24 determines the position on the movement path when machining is stopped by "G0" as the second position that is the end point of the partial path. In addition, the partial path generating unit 24 determines the position on the movement path when machining is started by "G1" as the first position that is the start point of the partial path. In the case of the machining program 20 illustrated in FIG. 7, the partial path generating unit 24 divides the movement path in machining the whole deposited object 18 into two partial paths, which are a partial path L1 in machining of the columnar object 51 and a partial path L2 in machining of the columnar object 52. As described above, the partial path generating unit 24 determines a boundary between partial paths on the basis of a change in the operation mode specified by the G code. Alternatively, the partial path generating unit 24 may determine the boundary on the basis of the start of the supply of the wire 5 and the stop of the supply thereof, or on the basis of on and off of the output of the laser beam. Alternatively, the partial path generating unit 24 may determine the first position and the second position on the basis of specifying of a change in the machining condition using an M code.

Next, the processes performed by the movement distance calculating unit 25 will be explained. The movement distance calculating unit 25 calculates, for each partial path, the first distance of the first movement section and the second distance of the second movement section. The movement distance calculating unit 25 obtains, for each partial path, a settling time Ts of the machining head 10 in response to a movement command on the basis of the transition of the estimated velocity Fc of the machining head 10. The settling time Ts is obtained by the following formula (1), which is an estimation equation. Note that As indicates an acceleration set in advance for the movement of the machining head 10. $\tau s$ indicates a filter time constant of the servomotors included in the head drive device 14.

$$Ts=(Fc/As)+\tau s \qquad (1)$$

The movement distance calculating unit 25 obtains, for each partial path, a settling time Tw of the rotary motor 4 in response to a supply command on the basis of the transition of the estimated rate Vc of the wire 5. The settling time Tw is obtained by the following formula (2), which is an estimation equation. Note that Aw indicates an acceleration set in advance for the supply of the wire 5. $\tau w$ indicates a filter time constant of the rotary motor 4.

$$Tw=(Vc/Aw)+\tau w \qquad (2)$$

Figure 12:
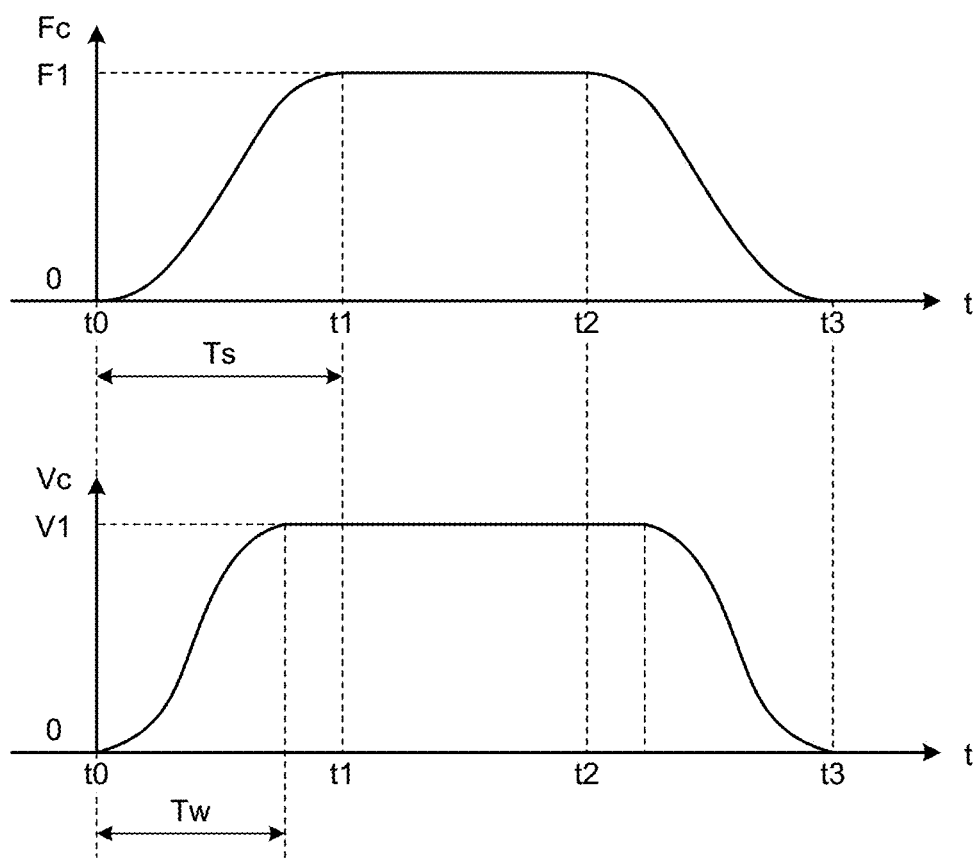
FIG. 12 is a first graph for explaining a process performed by a movement distance calculating unit owned by the NC device illustrated in FIG. 2.

FIG. 12 is a first graph for explaining processes performed by the movement distance calculating unit 25 owned by the NC device 1 illustrated in FIG. 2. Herein, calculation of the first distance and the second distance for a partial path L1 will be presented as an example. The first graph illustrates a case of Ts>Tw. The movement of the machining head 10 and the supply of the wire 5 are assumed to be started at the same time at time t0. The additive manufacturing apparatus 100 needs to start machining upon the elapse of the settling time Ts from time t0, that is, when the estimated velocity Fc reaches the velocity value F1, in order to make the relation between the estimated velocity Fc and the estimated rate Vc constant at the first position. The movement distance calculating unit 25 calculates the first distance on the basis of the settling time Ts. The movement distance calculating unit 25 calculates a distance Sr1 that is the first distance, by the following formula (3).

$$Sr1=Fc\times\{Ts-(Fc/2As)\} \qquad (3)$$

The movement distance calculating unit 25 also calculates the second distance in a manner similar to the first distance. The movement of the machining head 10 and the supply of the wire 5 are regarded as being stopped at the same time at time t3. When Ts>Tw, the additive manufacturing apparatus 100 needs to stop machining at the settling time Ts before time t3, that is, when the estimated velocity Fc starts lowering form the velocity value F1, in order to make the relation between the estimated velocity Fc and the estimated rate Vc constant at the second position. The movement distance calculating unit 25 calculates a distance Sr1 that is the second distance, by the above formula (3), in the same manner as the first distance. In this example, the first distance and the second distance are the same distance Sr1.

Figure 13:
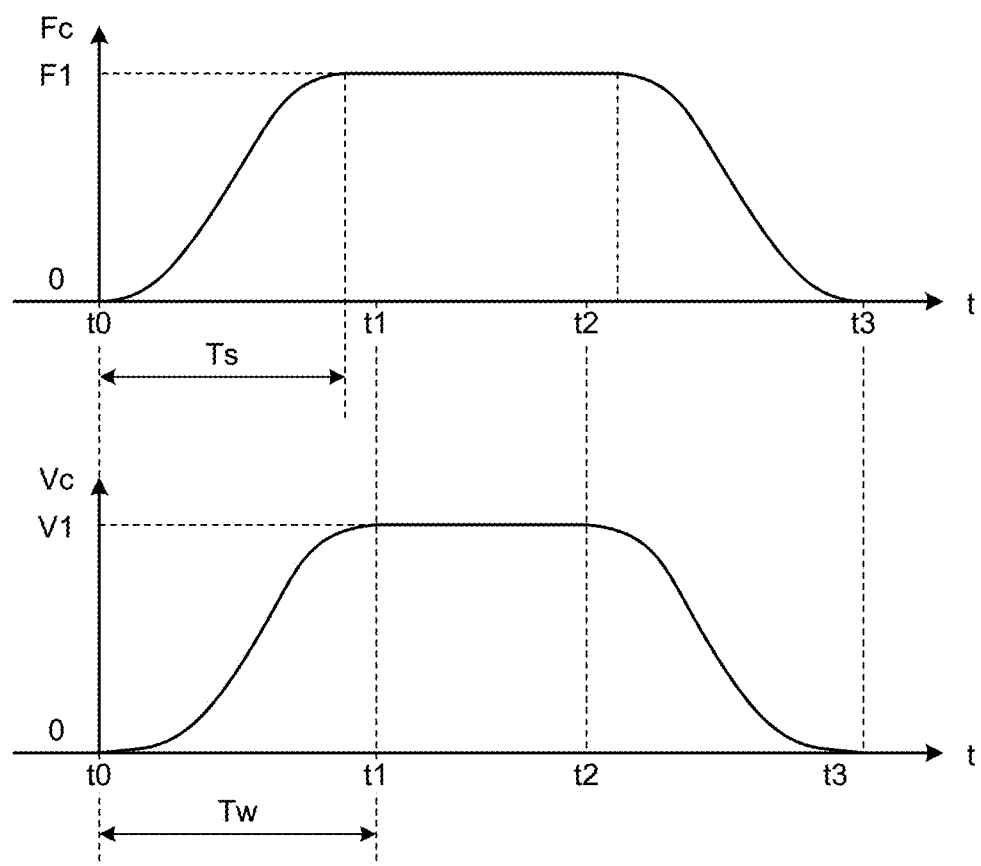
FIG. 13 is a second graph for explaining a process performed by the movement distance calculating unit owned by the NC device illustrated in FIG. 2.

FIG. 13 is a second graph for explaining processes performed by the movement distance calculating unit 25 owned by the NC device 1 illustrated in FIG. 2. The second graph illustrates a case of Ts<Tw. The additive manufacturing apparatus 100 needs to start machining upon the elapse of the settling time Tw from time t0, that is, when the estimated rate Vc reaches the rate value V1, in order to make the relation between the estimated velocity Fc and the estimated rate Vc constant at the first position. The movement distance calculating unit 25 calculates the first distance and the second distance on the basis of the settling time Tw of the wire 5. The movement distance calculating unit 25 calculates a distance Sr1 that is the first distance, by the following formula (4).

$$Sr1=Fc\times\{Tw-(Fc/2As)\} \qquad (4)$$

A specific example of the calculation of the distance Sr1 performed by the movement distance calculating unit 25 will now be explained. In this specific example, it is assumed that the filter time constants $\tau s$ and $\tau w$ satisfy $\tau s=\tau w=0$. In addition, each of the accelerations As and Aw set in advance is the same acceleration $\alpha$. In addition, Vc=Fc/2 is assumed to be satisfied. In this specific example, the settling time Ts is expressed as Ts=Fc/$\alpha$ by the above formula (1). The settling time Tw is expressed as Tw=Fc/2$\alpha$ by the above formula (2). Because the relation of Ts>Tw is satisfied between the settling time Ts and the settling time Tw, the movement distance calculating unit 25 calculates the distance Sr1 by the above formula (3). In this specific example, the distance Sr1 is calculated as Fc$^2$/2$\alpha$ from the formula (3).

The movement distance calculating unit 25 also calculates the second distance in a manner similar to the first distance. When Ts<Tw, the additive manufacturing apparatus 100 needs to stop machining at the settling time Tw before time t3, that is, when the estimated rate Vc starts lowering form the rate value V1, in order to make the relation between the estimated velocity Fc and the estimated rate Vc constant at the second position. The movement distance calculating unit 25 calculates a distance Sr1 that is the second distance, by the above formula (4) above, in the same manner as the first distance. In this example, each of the first distance and the second distance is the same distance Sr1.

The movement distance calculating unit 25 calculates, by the above formula (3) or (4), the first distance that enables the supply rate V to be increased from zero to the rate value V1 for machining during the movement through the first movement section, and the second distance that enables the supply rate V to be decreased from the rate value V1 to zero during the movement through the second movement section. The calculation of the first distance and the second distance based on the above formula (3) or (4) by the movement distance calculating unit 25 enables the NC device 1 to set the first movement section and the second movement section where the relation between the moving velocity F and the supply rate V in the partial path L1 can be constant. In a manner similar to the case of the partial path L1, the movement distance calculating unit 25 also calculates a distance Sr2, which is the first distance and the second distance, for a partial path L2.

Figure 14:
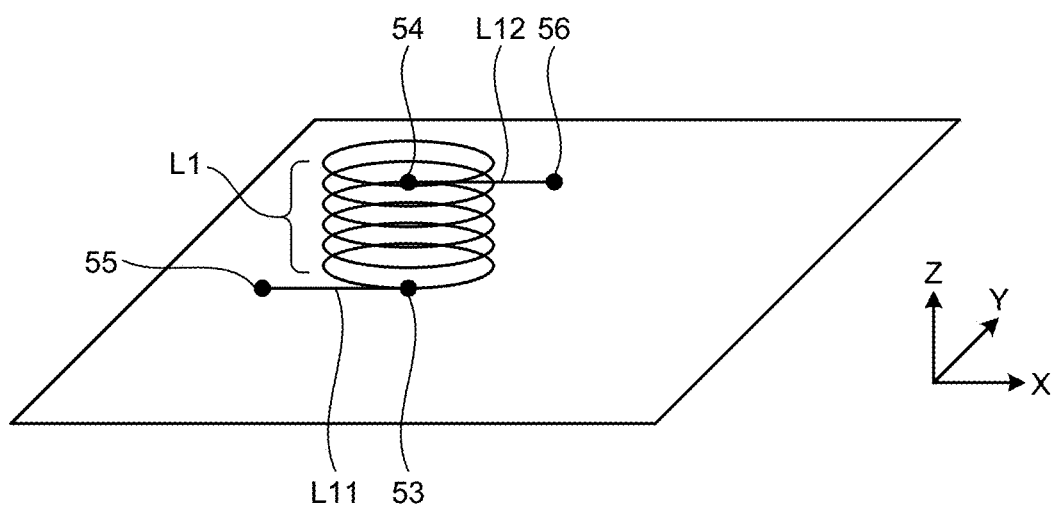
FIG. 14 is a first diagram for explaining a process performed by a movement section setting unit owned by the NC device illustrated in FIG. 2.

Next, processes performed by the movement section setting unit 26 will be explained. FIG. 14 is a first diagram for explaining the processes performed by the movement section setting unit 26 owned by the NC device 1 illustrated in FIG. 2. In the first diagram, description is given for setting of a first movement section L11 and a second movement section L12 of a partial path L1.

The movement section setting unit 26 obtains the tangential direction of the partial path L1 at a first position 53, and the tangential direction of the partial path L1 at a second position 54. Specifically, the movement section setting unit 26 obtains the tangential direction at the first position 53 on the basis of the coordinates of the first position 53 and the coordinates of an interpolated point adjacent to the first position 53. The movement section setting unit 26 obtains the tangential direction at the second position 54 on the basis of the coordinates of the second position 54 and the coordinates of an interpolated point adjacent to the second position 54.

The movement section setting unit 26 obtains the first movement section L11 in the same direction as the tangential direction at the first position 53. A start point 55 of the first movement section L11 corresponds to a position at the first distance, that is, the distance Sr1 from the first position 53. The first position 53 corresponds to the end point of the first movement section L11. The movement section setting unit 26 obtains the second movement section L12 in the same direction as the tangential direction at the second position 54. An end point 56 of the second movement section L12 corresponds to a position at the second distance, that is, the distance Sr1 from the second position 54. The second position 54 corresponds to the start point of the second movement section L12. In this way, the movement section setting unit 26 sets the first movement section L11 and the second movement section L12 for the partial path L1.

Figure 15:
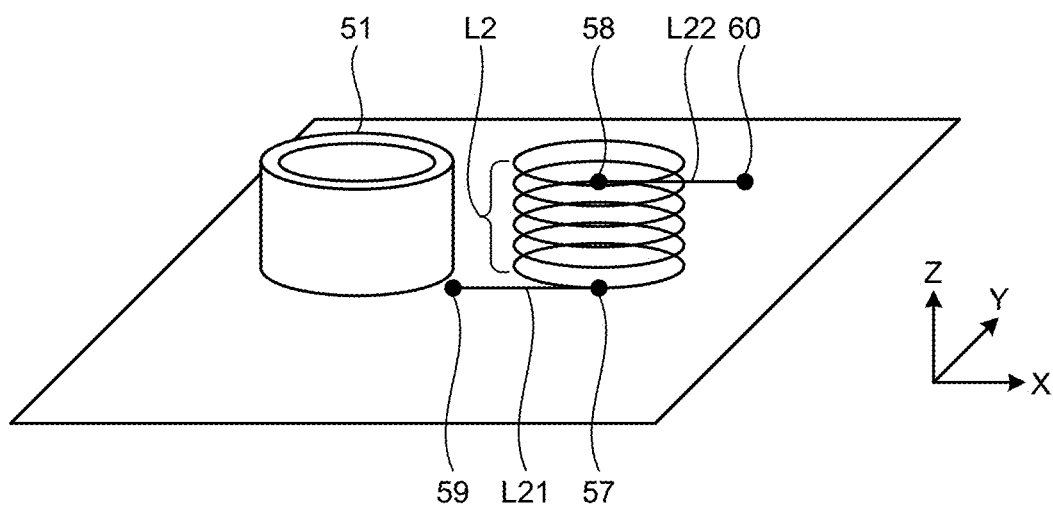
FIG. 15 is a second diagram for explaining a process performed by the movement section setting unit owned by the NC device illustrated in FIG. 2.

FIG. 15 is a second diagram for explaining the processes performed by the movement section setting unit 26 owned by the NC device 1 illustrated in FIG. 2. In the second diagram, description is given for setting of a first movement section L21 and a second movement section L22 of a partial path L2.

The movement section setting unit 26 obtains the tangential direction of the partial path L2 at a first position 57, and the tangential direction of the partial path L2 at a second position 58. Specifically, the movement section setting unit 26 obtains the tangential direction at the first position 57 on the basis of the coordinates of the first position 57 and the coordinates of an interpolated point adjacent to the first position 57. The movement section setting unit 26 obtains the tangential direction at the second position 58 on the basis of the coordinates of the second position 58 and the coordinates of an interpolated point adjacent to the second position 58.

The movement section setting unit 26 obtains the first movement section L21 in the same direction as the tangential direction at the first position 57. A start point 59 of the first movement section L21 corresponds to a position at the first distance, that is, the distance Sr2 from the first position 57. The first position 57 corresponds to the end point of the first movement section L21. The movement section setting unit 26 obtains the second movement section L22 in the same direction as the tangential direction at the second position 58. An end point 60 of the second movement section L22 corresponds to a position at the second distance, that is, the distance Sr2 from the second position 58. The second position 58 corresponds to the start point of the second movement section L22. In this way, the movement section setting unit 26 sets the first movement section L21 and the second movement section L22 for the partial path L2.

Next, processes performed by the condition adjusting unit 28 will be explained. Herein, adjustment of the partial path L1, and the first movement section L11 and the second movement section L12 set for the partial path L1 will be explained as an example. The condition adjusting unit 28 adjusts the machining condition of the columnar object 51 in accordance with the setting of the first movement section L11 and the second movement section L12 performed by the movement section setting unit 26. The condition adjusting unit 28 adjusts the condition on the supply of the wire 5 and the condition on the output of the laser beam for the partial path L, the first movement section L11, and the second movement section L12.

The condition adjusting unit 28 adjusts the condition on the supply of the wire 5 so that the supply of the wire 5 is started at the same time as the start of the movement of the machining head 10 from the start point 55. In the case of Ts>Tw as illustrated in FIG. 12, the condition adjusting unit 28 adjusts the condition on the output of the laser beam so that the output of the laser beam is started when the estimated velocity Fc reaches the velocity value F1. In the case of Ts>Tw, the position of the machining head 10 when the estimated velocity Fc reaches the velocity value F1 corresponds to the first position 53. In the case of Ts<Tw as illustrated in FIG. 13, the condition adjusting unit 28 adjusts the condition on the output of the laser beam so that the output of the laser beam is started when the estimated rate Vc reaches the rate value V1. In the case of Ts<Tw, the position of the machining head 10 when the estimated rate Vc reaches the rate value V1 is the first position. The adjustment of the condition on the supply of the wire 5 and the condition on the output of the laser beam enables the NC device 1 to supply the wire 5 at a constant rate value V1 during the period in which the moving velocity F has a constant velocity value F1 and the laser beam is emitted.

The condition command generating unit 27 generates a supply command for supply of the wire 5 and an output command for output of the laser beam in the first movement section L11 and in the second movement section L12 on the basis of the conditions adjusted by the condition adjusting unit 28. The condition command generating unit 27 also generates various commands for the partial path L1 on the basis of the conditions adjusted by the condition adjusting unit 28. The condition command generating unit 27 outputs the generated various commands.

The command value generating unit 23 generates movement commands for the partial path L1, the first movement section L11, and the second movement section L12. The command value generating unit 23 performs an acceleration/deceleration process, which is a process of generating a velocity waveform that enables acceleration/deceleration at a preset acceleration, and a smoothing process, which is a process of smoothing the velocity waveform. The smoothing process is also called a moving average filtering process. The command value generating unit 23 outputs the generated movement commands.

The rotary motor 4 illustrated in FIG. 1 rotates in a forward direction, which is a first direction, while the machining head 10 is moved from the start point of the first movement section L11 to the end point of the second movement section L12. The rotation of the rotary motor 4 in the forward direction causes the wire 5 to be supplied toward the workpiece. The condition command generating unit 27 may generate a command for a pull-back operation of making the rotary motor 4 operate in a reverse direction, which is a second direction opposite to the first direction, before the movement of the machining head 10 is started from the start point of the first movement section L11. The condition command generating unit 27 may generate a command for a pull-back operation of making the rotary motor 4 operate in the reverse direction after the movement of the machining head 10 is stopped at the end point of the second movement section L12. The NC device 1 is capable of suppressing excessive feeding of the wire 5 by such a pull-back operation. The NC device 1 is capable of positioning the leading end of the wire 5 at the irradiation position of the laser beam at the time of start of machining on a partial path.

Figure 16:
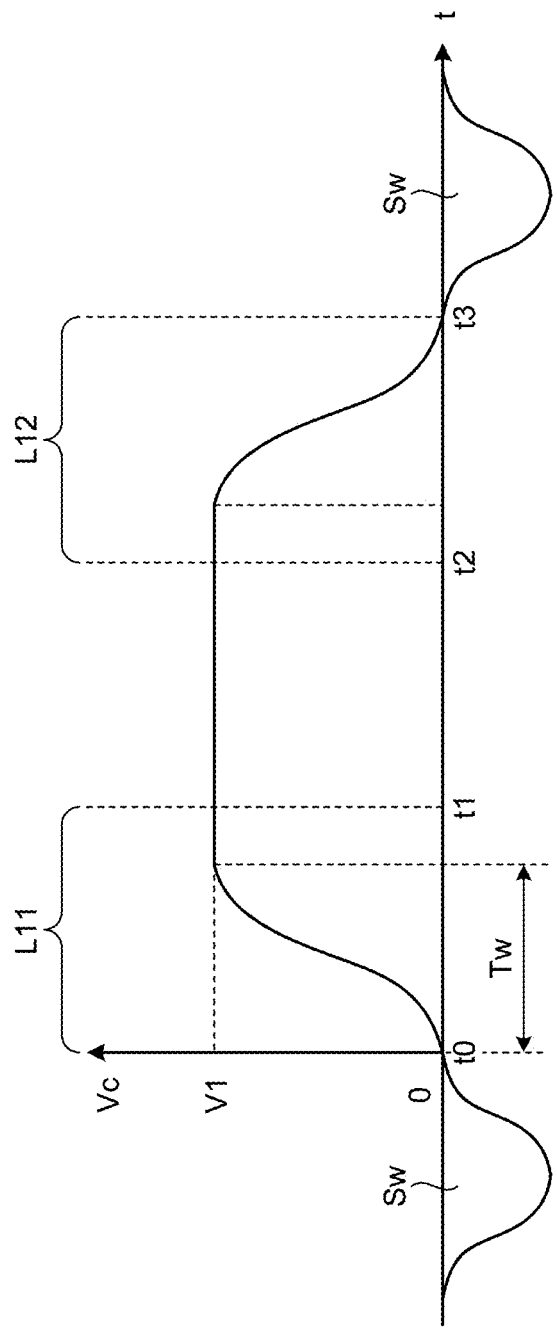
FIG. 16 is a first graph for explaining a process performed by a condition adjusting unit owned by the NC device illustrated in FIG. 2.

Processes performed by the condition adjusting unit 28 for making the rotary motor 4 perform the pull-back operation will now be explained. FIG. 16 is a first graph for explaining the processes performed by the condition adjusting unit 28 owned by the NC device 1 illustrated in FIG. 2. In the case of Ts>Tw, the length Sw by which the wire 5 moves while the machining head 10 moves through the first movement section L11 is expressed by the following formula (5). The length Sw also corresponds to the length by which the wire 5 moves while the machining head 10 moves through the second movement section L12.

$$Sw = Vc \times \{Ts - (Vc/2Aw)\} \quad (5)$$

Figure 17:
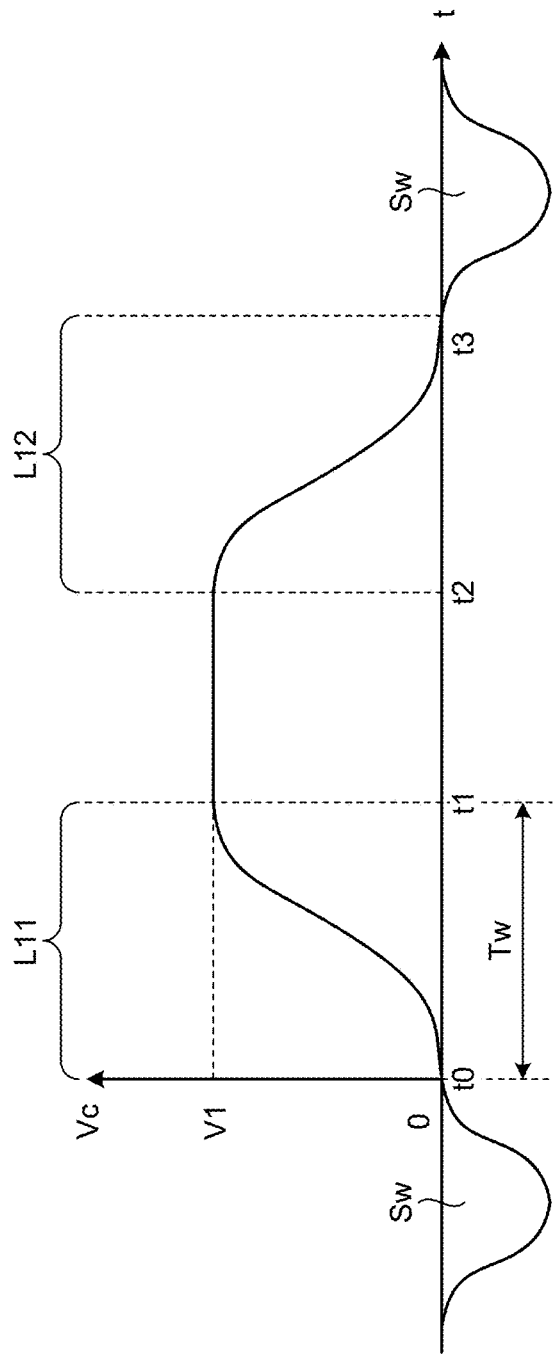
FIG. 17 is a second graph for explaining a process performed by the condition adjusting unit owned by the NC device illustrated in FIG. 2.

FIG. 17 is a second graph for explaining the processes performed by the condition adjusting unit 28 owned by the NC device 1 illustrated in FIG. 2. In the case of Ts<Tw, the length Sw by which the wire 5 moves while the machining head 10 moves through the first movement section L11 is expressed by the following formula (6). The length Sw also corresponds to the length by which the wire 5 moves while the machining head 10 moves through the second movement section L12.

$$Sw = Vc \times \{Tw - (Vc/2Aw)\} \quad (6)$$

The condition adjusting unit 28 performs adjustment for making the rotary motor 4 perform the pull-back operation of pulling back the wire 5 of the length Sw calculated by the above formula (5) or (6) in addition to the rotating operation in the first movement section L11, the partial path L1, and the second movement section L12. The condition command generating unit 27 generates a command for the pull-back operation on the basis of the condition adjusted by the condition adjusting unit 28. Note that the condition command generating unit 27 only needs to generate at least one of a command for a pull-back operation before the movement of the machining head 10 is started from the start point 55 of the first movement section L11 and a command for a pull-back operation after the movement of the machining head 10 is stopped at the end point 56 of the second movement section L12. The NC device 1 is capable of suppressing excessive feeding of the wire 5 by making the rotary motor 4 perform at least one of the pull-back operation before the movement of the machining head 10 is started from the start point 55 and the pull-back operation after the movement of the machining head 10 is stopped at the end point 56.

Note that the condition adjusting unit 28 also adjusts the conditions for the partial path L2, the first movement section L21, and the second movement section L22 in a manner similar to that for the partial path L1, the first movement section L11, and the second movement section L12. The condition command generating unit 27 generates a supply command for supply of the wire 5 and an output command for output of the laser beam in the first movement section L21 and in the second movement section L22 on the basis of the conditions adjusted by the condition adjusting unit 28. The condition command generating unit 27 also generates various commands for the partial path L2 on the basis of the conditions adjusted by the condition adjusting unit 28.

According to the first embodiment, the NC device 1 calculates the first distance on the basis of the result of analysis performed by the program analyzing unit 22, and increases the supply amount per hour of the material from zero to a command value according to the machining condition while the machining head 10 moves through the first movement section having a first length. The NC device 1 calculates the second distance on the basis of the result of analysis performed by the program analyzing unit 22, and decreases the supply amount per hour of the material from the command value according to the machining condition to zero while the machining head 10 moves through the second movement section having a second length. The NC device 1 can make the supply amount of the wire 5 at each interpolated point of the movement path constant by controlling the supply amount in first movement section and controlling the supply amount in the second movement section. As a result, the NC device 1 produces an advantageous effect of enabling the additive manufacturing apparatus 100 to perform machining with high machining accuracy.

Note that, in the first embodiment, the beam may be a beam other than a laser beam, and may be an electron beam. The additive manufacturing apparatus 100 may include an electron beam generation source that is a beam source. In addition, in the first embodiment, the material may be a material other than the wire 5, and may be metal powder. The NC device 1 also enables the additive manufacturing apparatus 100 to perform machining with high machining accuracy even in a case where the beam is a beam other than the laser beam or even in a case where the material is a material other than the wire 5.

The movement distance calculating unit 25 is not limited to a unit that calculates the first distance and the second distance, and may be a unit that calculate any one of the first distance and the second distance. The condition command generating unit 27 is not limited to a unit that generates a supply command to increase the material supply amount in the first movement section and a supply command to decrease the material supply amount in the second movement section, and may be a unit that generates any one of the supply command to increase the material supply amount in the first movement section and the supply command to decrease the material supply amount in the second movement section. The movement section setting unit 26 is not limited to a unit that sets the first movement section and the second movement section, and may be a unit that sets any one of the first movement section and the second movement section. The NC device 1 produces the effect of enabling the additive manufacturing apparatus 100 to achieve high machining accuracy by controlling the material supply amount in at least one of the first movement section and the second movement section as with the first embodiment.

Second Embodiment

Figure 18:
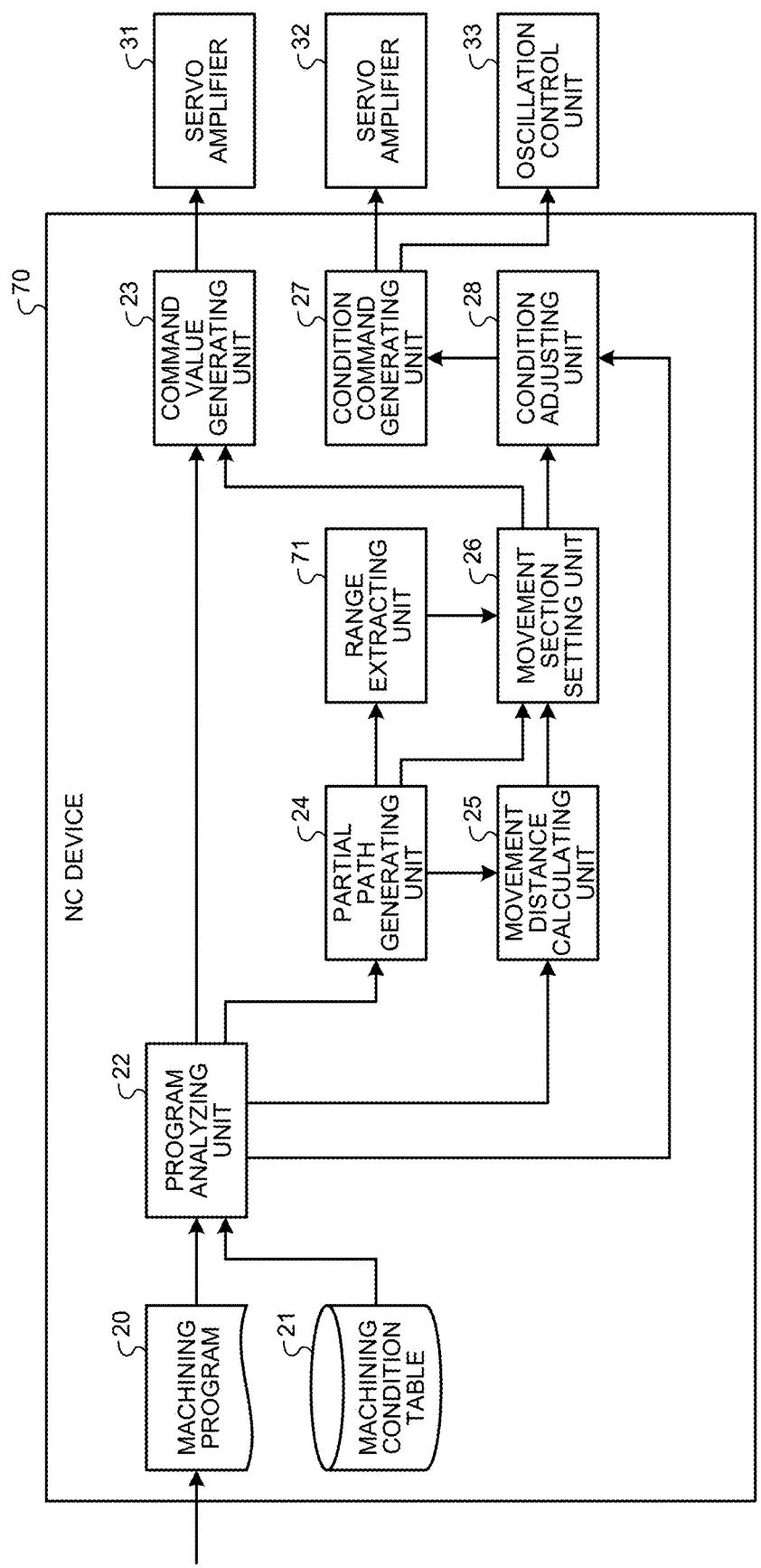
FIG. 18 is a diagram illustrating a functional configuration of an NC device according to a second embodiment of the present invention.

FIG. 18 is a diagram illustrating a functional configuration of an NC device 70 according to a second embodiment of the present invention. The NC device 70 includes a range extracting unit 71 that extracts a range in which the machining head 10 is movable, and sets a first movement section and a second movement section within the range extracted by the range extracting unit 71. The NC device 70 has the same configuration as the NC device 1 according to the first embodiment, except that the range extracting unit 71 is provided. The functions of the NC device 70 are implemented with use of a hardware configuration in the same manner as the NC device 1 according to the first embodiment. In the second embodiment, components that are the same as those in the first embodiment described above will be given the same reference symbols, and features different from those in the first embodiment will be mainly described.

The range extracting unit 71 acquires data on a partial path from the partial path generating unit 24. The range extracting unit 71 extracts, for each partial path, a range in which the movement of the machining head 10 to the first position and the movement of the machining head 10 from the second position are enabled. The range extracting unit 71 obtains a maximum movable range, which is a range of a maximum stroke within which the machining head 10 is movable in three-dimensional directions. Data on the maximum stroke is stored in the external storage device 44 illustrated in FIG. 3. The range extracting unit 71 obtains the maximum movable range on the basis of the data on the maximum stroke stored in the external storage device 44.

Furthermore, the range extracting unit 71 extracts, for each partial path, a movable range, which is a range in which the machining head 10 is movable, from the maximum movable range. The range extracting unit 71 extracts, for each partial path, a movable range, which is a remaining range obtained after excluding a space to be occupied by a deposited object finally-machined before machining on the current partial path is performed from a possible movable range. In this manner, the range extracting unit 71 extracts the movable range, which is a range obtained by excluding a range into which the machining head 10 cannot be moved owing to a structural reason of the additive manufacturing apparatus 100 and a range in which already-machined deposited object is to be present. The range extracting unit 71 outputs data of the extracted movable range to the movement section setting unit 26.

Figure 19:
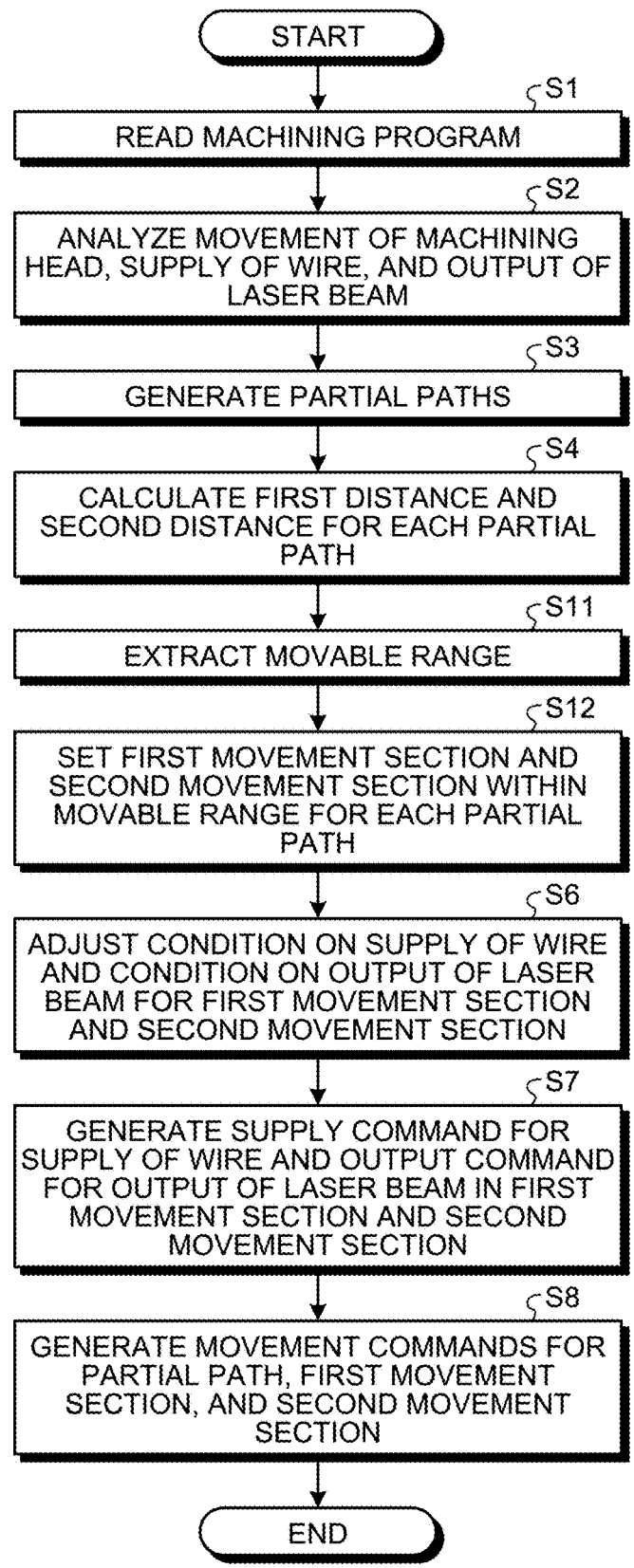
FIG. 19 is a flowchart illustrating a procedure of an operation performed by the NC device illustrated in FIG. 18.

Next, an operation of the NC device 70 will be explained. FIG. 19 is a flowchart illustrating a procedure of the operation of the NC device 70 illustrated in FIG. 18. The procedure from steps S1 to S4 is the same as that in steps S1 to S4 shown in FIG. 4.

In step S11, the range extracting unit 71 extracts a movable range. Note that the order of the operation in step S4 and the operation in step S11 may be reversed with respect to that illustrated in FIG. 19. The NC device 70 may perform the operation in step S4 and the operation in step S11 at the same time.

In step S12, the movement section setting unit 26 sets, for each partial path, a first movement section and a second movement section within the movable range extracted in step S11. The procedure in steps S6 to S8 is the same as that in steps in S6 to S8 illustrated in FIG. 4. The NC device 70 thus terminates the operation according to the procedure illustrated in FIG. 19.

Next, details of the processes performed by the components of the NC device 70 illustrated in FIG. 18 will be explained. The range extracting unit 71 extracts, for each partial path, a movable range R by excluding a space to be occupied by a deposited object already-machined before machining on the current partial path is performed from the maximum movable range. Alternatively, the range extracting unit 71 may obtain a range of a space other than the space to be occupied by an already-machined deposited object and a range corresponding to the maximum movable range, and extract a movement range R that corresponds to both of the two ranges.

The movement section setting unit 26 obtains a first movement section and a second movement section of each partial path as with the first embodiment. The movement section setting unit 26 determines whether or not the whole of the obtained first movement section and second movement section is covered in the movable range R. If the whole of the obtained first movement section and second movement section are included in the movable range R, the movement section setting unit 26 sets the first movement section and the second movement section as with the case of the first embodiment.

On the other hand, if part of the obtained first movement section and second movement section is not covered in the movable range R, the movement section setting unit 26 performs modification to include the whole of the first movement section and second movement section within the movable range R.

Figure 20:
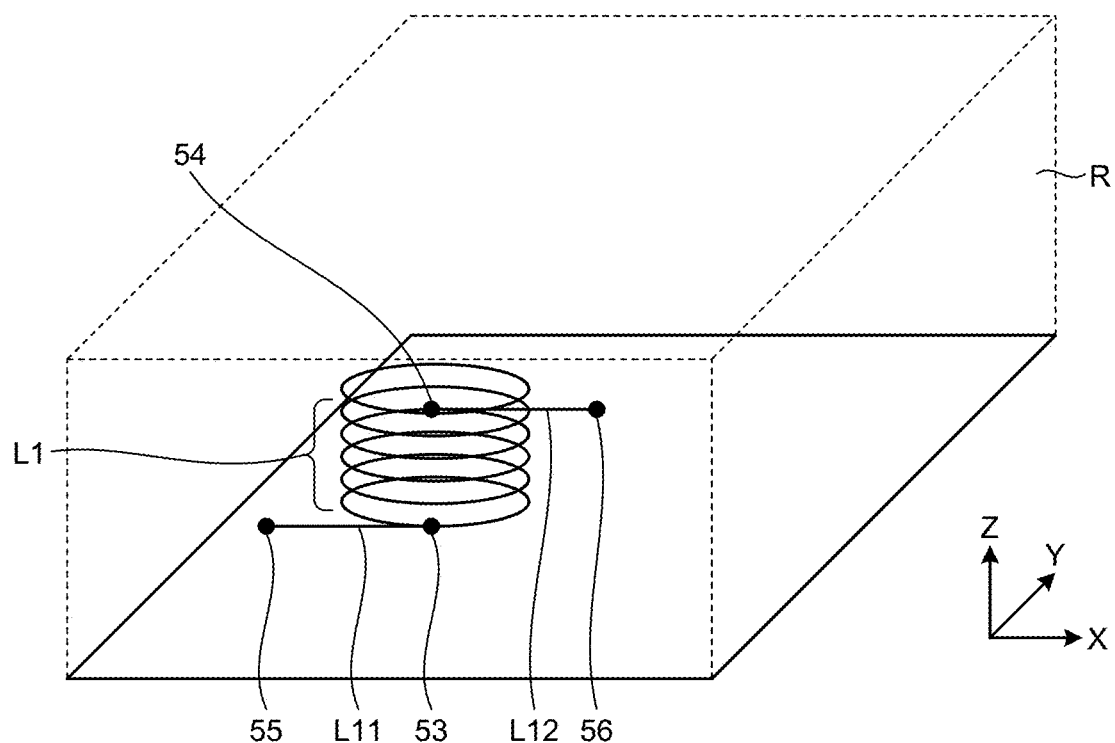
FIG. 20 is a first diagram for explaining a process performed by a movement section setting unit owned by the NC device illustrated in FIG. 18.

FIG. 20 is a first diagram for explaining processes performed by the movement section setting unit 26 owned by the NC device 70 illustrated in FIG. 18. The first diagram illustrates an example of a first movement section L11 and a second movement section L12 obtained for a partial path L1. Because any deposited objects already-machined before the machining on the partial path L1 are not present, the movable range R for the partial path L1 is equal to the maximum movable range. In the example illustrated in FIG. 20, the whole of the obtained first movement section L11 and second movement section L12 is assumed to be included in the movable range R. In this case, the movement section setting unit 26 sets the first movement section L11 and the second movement section L12 for the partial path L1.

Figure 21:
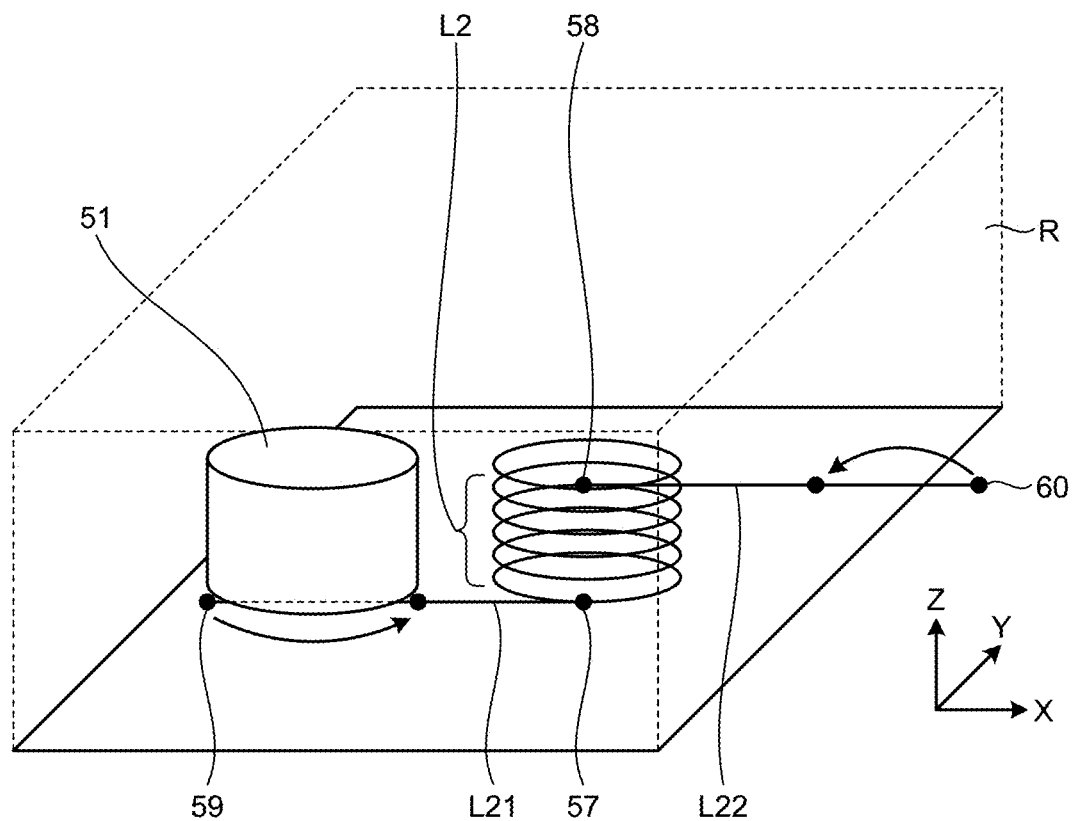
FIG. 21 is a second diagram for explaining a process performed by the movement section setting unit of the NC device illustrated in FIG. 18.

FIG. 21 is a second diagram for explaining the processes performed by the movement section setting unit 26 owned by the NC device 70 illustrated in FIG. 18. The second diagram illustrates an example of a first movement section L21 and a second movement section L22 obtained for a partial path L2. Because a columnar object 51, which is deposits to be finally machined before the machining on the partial path L2 is performed, is present, the movable range R for the partial path L2 is a range obtained by excluding the space occupied by the columnar object 51 from the maximum movable range. In the example illustrated in FIG. 21, part of the obtained first movement section L21 enters the space occupied by the columnar object 51 and is thus not included in the movable range R. In addition, part of the obtained second movement section L22 including the end point 60 is beyond the maximum movable range and is thus not included in the movable range R.

The movement section setting unit 26 changes the position of the start point 59 of the first movement section L21 to a position on the side of the partial path L2 with respect to the columnar object 51 by moving the start point 59 toward the first position 57. The movement section setting unit 26 performs modification to shorten the first distance calculated by the movement distance calculating unit 25. In addition, the movement section setting unit 26 changes the position of the end point 60 of the second movement section L22 to a position within the movable range R by moving the end point 60 toward the second position 58. The movement section setting unit 26 performs modification to shorten the second distance calculated by the movement distance calculating unit 25. In this manner, the movement section setting unit 26 performs, for the partial path L2, modification to include the whole of the first movement section L21 and second movement section L22 within the movable range R.

The condition adjusting unit 28 performs, for the partial path L2, adjustment of the conditions in association with the changes in the first distance and the second distance made by the movement section setting unit 26 in addition to the adjustment of the conditions performed as with the first embodiment. When the first distance is changed from the above-mentioned "Sr2" to "Sr2'", the condition adjusting unit 28 modifies the condition on the supply of the wire 5 and the condition on the output of the laser beam for the first movement section L21.

The condition adjusting unit 28 modifies the estimated velocity Fc, the estimated rate Vc, and the settling times Ts and Tw on the basis of the above formulas (3) and (4) used for calculation of the distances Sr1 and Sr2 in the first embodiment. Note that the modified estimated velocity Fc and the modified estimated rate Vc are represented as "Fc'" and "Vc'", respectively, and the modified settling times Ts and Tw are represented as "Ts'" and "Tw'", respectively. "Fc'" is obtained by solving a quadratic equation, the quadratic equation being obtained by replacing the left side of the above formula (3) or (4) with "Sr2'" and replacing "Fc" with "Fc'" and having "Fc'" as a variable. Because "Fc'" and "Ts'" satisfy the relation of the above formula (1) as in "Fc" and "Ts", "Ts'" can be obtained from the obtained "Fc'" and formula (1). Because "Fc'" and "Tw'" satisfy the relation of the above formula (2) as in "Fc" and "Tw", "Tw'" is obtained from the obtained "Fc'" and formula (2).

The condition adjusting unit 28 modifies the condition on the supply of the wire 5 so that the supply of the wire 5 is started at the same time as the start of the movement of the machining head 10 from the start point 55. In the case of Ts'>Tw' as in the case illustrated in FIG. 12, the condition adjusting unit 28 modifies the condition on the output of the laser beam so that the output of the laser beam is started when the estimated velocity Fc' reaches the velocity value F1. In the case of Ts'<Tw' as in the case illustrated in FIG. 13, the condition adjusting unit 28 adjusts the condition on the output of the laser beam so that the output of the laser beam is started when the estimated rate Vc' reaches the rate value V1. Note that the estimated rate Vc' is obtained on the basis of the above formulas (5) and (6).

The condition adjusting unit 28 also modifies the condition on the supply of the wire 5 and the condition on the output of the laser beam for the second movement section L22 in a manner similar to the modification for the first movement section L21. The command value generating unit 23 generates, for the partial path L2, movement commands for the modified first movement section L21 and for the modified second movement section L22.

According to the second embodiment, the NC device 70 can set the first movement section and the second movement section within a range in which the machining head 10 can move, by extraction of the range performed by the range extracting unit 71. The NC device 70 can make the supply amount of the wire 5 at each interpolated point of the movement path constant, by modifying the condition on the supply of the wire 5 and the condition on the output of the laser beam in accordance with a change in the first distance or a change in the second distance. As a result, the NC device 70 produces an effect of enabling the additive manufacturing apparatus 100 to perform machining with high machining accuracy.

The range extracting unit 71 is not limited to a unit that sets the first movement section and the second movement section within the movable range R, and may be a unit that sets any one of the first movement section and the second movement section in the movable range R. The NC device 70 can produce an effect of enabling the additive manufacturing apparatus 100 to perform machining with high machining accuracy by setting at least one of the first movement section and the second movement section within the movable range R as with the second embodiment.

The configurations presented in the embodiments above are examples of the present invention, which can be combined with other publicly known techniques or can be partly omitted and/or modified without departing from the scope of the present invention.

REFERENCE SIGNS LIST

1, 70 NC device; 2 laser oscillator; 3 fiber cable; 4 rotary motor; 5 wire; 6 wire spool; 7 gas supplying device; 8 pipe; 10 machining head; 11 beam nozzle; 12 wire nozzle; 13 gas nozzle; 14 head drive device; 15 stage; 16 rotation mechanism; 17 base material; 18 deposited object; 20 machining program; 20a, 20b block group; 21 machining condition table; 22 program analyzing unit; 23 command value generating unit; 24 partial path generating unit; 25 movement distance calculating unit; 26 movement section setting unit; 27 condition command generating unit; 28 condition adjusting unit; 31, 32 servo amplifier; 33 oscillation control unit; 41 CPU; 42 RAM; 43 ROM; 44 external storage device; 45 input/output interface; 46 bus; 50 modeled object; 51, 52 columnar object; 53, 57 first position; 54, 58 second position; 55, 59 start point; 56, 60 end point; 71 range extracting unit; 100 additive manufacturing apparatus; L11, L21 first movement section; L12, L22 second movement section; R movable range.

The invention claimed is:

1. A numerical control device that controls, in accordance with a machining program, an additive manufacturing apparatus that includes a machining head emitting a beam and produces a modeled object by adding a material molten by irradiation of the beam to a workpiece, the numerical control device comprising:
program analyzing circuitry to analyze a transition of a moving velocity of the machining head relative to the workpiece and a transition of a supply amount of the material supplied to an irradiation position of the beam on the basis of the machining program;
movement distance calculating circuitry to calculate a first distance on the basis of a result of analysis performed by the program analyzing circuitry, the first distance being a length of a first movement section to a first position with which addition of the material to the workpiece is started, the first movement section being a linear section through which the machining head is moved while the head is accelerated from zero to a constant velocity value; and
condition command generating circuitry to generate a supply command to increase the supply amount of the material per hour to the irradiation position of the beam from zero to a command value according to a machining condition while the machining head is moved through the first movement section;
wherein the condition command generating circuitry generates an output command to start output of the beam when the machining head reaches the first position.

2. The numerical control device according to claim 1, wherein the condition command generating circuitry generates a command for a pull-back operation of making driving circuitry of the additive manufacturing apparatus operate in a second direction opposite to a first direction before movement of the machining head is started from a start point of the first movement section, the first direction being a direction in which the driving circuitry operates for supply of the material in the first movement section.

3. The numerical control device according to claim 1, further comprising:
partial path generating circuitry to generate a partial path obtained by dividing a movement path through which the machining head is moved, by extracting the partial path from the movement path, the partial path having the first position as a start point and a second position at which addition of the material continued from the first position is stopped as an end point; and movement section setting circuitry to set the first movement section having the first distance in a tangential direction of the partial path at the first position.

4. The numerical control device according to claim 3, comprising:

range extracting circuitry to extract a range in which the machining head can move, wherein the movement section setting circuitry sets the first movement section within the range extracted by the range extracting circuitry.

5. A numerical control device that controls, in accordance with a machining program, an additive manufacturing apparatus that includes a machining head emitting a beam and produces a modeled object by adding a material molten by irradiation of the beam to a workpiece, the numerical control device comprising:

program analyzing circuitry to analyze a transition of a moving velocity of the machining head relative to the workpiece and a transition of a supply amount of the material supplied to an irradiation position of the beam on the basis of the machining program;

movement distance calculating circuitry to calculate a second distance on the basis of a result of analysis performed by the program analyzing circuitry, the second distance being a length of a second movement section from a second position at which addition of the material to the workpiece is stopped, the second movement section being a linear section through which the machining head is moved while the head is decelerated from a constant velocity value to zero; and condition command generating circuitry to generate a supply command to decrease the supply amount of the material per hour to the irradiation position of the beam from a command value according to a machining condition to zero while the machining head is moved through the second movement section;

wherein the condition command generating circuitry generates an output command to stop output of the beam when the machining head reaches the second position.

6. The numerical control device according to claim 5, wherein the condition command generating circuitry generates a command for a pull-back operation of making driving circuitry of the additive manufacturing apparatus operate in a second direction opposite to a first direction after movement of the machining head is stopped at an end point of the second movement section, the first direction being a direction in which the driving circuitry operates for supply of the material in the second movement section.

7. The numerical control device according to claim 5, comprising:

partial path generating circuitry to generate a partial path obtained by dividing a movement path through which the machining head is moved, by extracting the partial path from the movement path, the partial path having, as a start point, a first position at which addition of the material to the workpiece is started and, as an end point, the second position; and movement section setting circuitry to set the second movement section having the second distance in a tangential direction of the partial path at the second position.

8. The numerical control device according to claim 7, comprising:

range extracting circuitry to extract a range in which the machining head can move, wherein the movement section setting circuitry sets the second movement section within the range extracted by the range extracting circuitry.

* * * * *